United States Patent
Wu et al.

(10) Patent No.: US 12,206,097 B2
(45) Date of Patent: Jan. 21, 2025

(54) COATINGS FOR CATHODE ACTIVE MATERIALS

(71) Applicant: Apple Inc., Cupertino, CA (US)

(72) Inventors: Huiming Wu, San Jose, CA (US);
Hongli Dai, Los Altos, CA (US);
Dapeng Wang, Cupertino, CA (US);
Hakim H. Iddir, Hoffman Estates, CA (US); Anh Vu, Naperville, IL (US);
John David Carter, Bolingbrook, IL (US); Xiaoping Wang, Naperville, IL (US); Yan Li, Westmont, IL (US);
Zhenzhen Yang, Godfrey, IL (US);
Yanjie Cui, Arlington Heights, IL (US);
James Gilbert, Bolingbrook, IL (US);
Christopher S. Johnson, Naperville, IL (US); Arthur Jeremy Kropf,
Westmont, IL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/348,766

(22) Filed: Jul. 7, 2023

(65) Prior Publication Data
US 2023/0361283 A1 Nov. 9, 2023

Related U.S. Application Data

(62) Division of application No. 16/531,883, filed on Aug. 5, 2019, now Pat. No. 11,749,799.
(Continued)

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/525* (2013.01); *H01M 4/628* (2013.01); *H01M 10/0525* (2013.01); *H01M 2004/028* (2013.01)

(58) Field of Classification Search
CPC ...... H01M 4/366; H01M 4/525; H01M 4/628; H01M 10/0525; H01M 2004/028
See application file for complete search history.

(56) References Cited

U.S. PATENT DOCUMENTS

| | | |
|---|---|---|
| 5,744,262 A | 4/1998 | Cheng et al. |
| 5,993,998 A | 11/1999 | Yasuda |

(Continued)

FOREIGN PATENT DOCUMENTS

| | | |
|---|---|---|
| CN | 1588675 A | 3/2005 |
| CN | 1702891 A | 11/2005 |

(Continued)

OTHER PUBLICATIONS

Machine Translation of CN104685677A (Jun. 15, 2024) (Year: 2024).*

(Continued)

*Primary Examiner* — Matthew J Merkling
(74) *Attorney, Agent, or Firm* — BakerHostetler

(57) ABSTRACT

A cathode active material includes a plurality of cathode active compound particles and a coating disposed over each of the cathode active compound particles. The coating includes a lithium (Li)-ion conducting oxide containing lanthanum (La) and titanium (Ti).

12 Claims, 4 Drawing Sheets

Related U.S. Application Data

(60) Provisional application No. 62/765,116, filed on Aug. 17, 2018.

(51) Int. Cl.
 *H01M 4/525* (2010.01)
 *H01M 4/62* (2006.01)
 *H01M 10/0525* (2010.01)

(56) References Cited

U.S. PATENT DOCUMENTS

| | | |
|---|---|---|
| 6,007,947 A | 12/1999 | Mayer |
| 6,077,496 A | 6/2000 | Ito et al. |
| 6,677,082 B2 | 1/2004 | Thackeray et al. |
| 6,680,143 B2 | 1/2004 | Thackeray et al. |
| 6,878,487 B2 | 4/2005 | Cho et al. |
| 7,135,252 B2 | 11/2006 | Thackeray et al. |
| 7,205,072 B2 | 4/2007 | Kang et al. |
| 7,235,193 B2 | 6/2007 | Park et al. |
| 7,238,450 B2 | 7/2007 | Howard et al. |
| 7,314,682 B2 | 1/2008 | Thackeray et al. |
| 7,314,684 B2 | 1/2008 | Kang et al. |
| 7,435,402 B2 | 10/2008 | Kang et al. |
| 7,468,223 B2 | 12/2008 | Thackeray et al. |
| 7,655,361 B2 | 2/2010 | Kim et al. |
| 7,691,535 B2 | 4/2010 | Shiozaki et al. |
| 7,732,096 B2 | 6/2010 | Thackeray et al. |
| 7,754,384 B2 | 7/2010 | Patoux et al. |
| 7,897,674 B2 | 3/2011 | Zaghib et al. |
| 7,923,149 B2 | 4/2011 | Hwang et al. |
| 8,148,011 B2 | 4/2012 | Thackeray et al. |
| 8,187,746 B2 | 5/2012 | Chen et al. |
| 8,206,852 B2 | 6/2012 | Chang et al. |
| 8,277,683 B2 | 10/2012 | Deng et al. |
| 8,337,727 B2 | 12/2012 | Chen et al. |
| 8,343,663 B2 | 1/2013 | Jung et al. |
| 8,383,077 B2 | 2/2013 | Thackeray et al. |
| 8,535,832 B2 | 9/2013 | Karthikeyan et al. |
| 8,801,960 B2 | 8/2014 | Ueda et al. |
| 8,802,290 B2 | 8/2014 | Li et al. |
| 9,166,222 B2 | 10/2015 | Amiruddin et al. |
| 9,716,265 B2 | 7/2017 | Dai et al. |
| 9,843,041 B2 | 12/2017 | Lopez et al. |
| 10,084,187 B2 | 9/2018 | Dai et al. |
| 10,128,494 B2 | 11/2018 | Dai et al. |
| 10,141,572 B2 | 11/2018 | Wu et al. |
| 10,164,256 B2 | 12/2018 | Wu et al. |
| 10,297,821 B2 | 5/2019 | Dai et al. |
| 10,297,823 B2 | 5/2019 | Dai et al. |
| 10,347,909 B2 | 7/2019 | Dai et al. |
| 10,593,941 B2 | 3/2020 | Dai et al. |
| 10,597,307 B2 | 3/2020 | Dai et al. |
| 10,615,413 B2 | 4/2020 | Dai et al. |
| 2002/0061444 A1 | 5/2002 | Kweon et al. |
| 2002/0114995 A1 | 8/2002 | Thackeray et al. |
| 2002/0136954 A1 | 9/2002 | M. Thackeray et al. |
| 2002/0182504 A1 | 12/2002 | Imachi et al. |
| 2002/0192565 A1 | 12/2002 | Ueda et al. |
| 2003/0013017 A1 | 1/2003 | Nagayama et al. |
| 2003/0039886 A1 | 2/2003 | Zhang et al. |
| 2003/0054250 A1 | 3/2003 | Kweon et al. |
| 2003/0073002 A1 | 4/2003 | Imachi et al. |
| 2003/0082445 A1 | 5/2003 | Smith et al. |
| 2003/0087155 A1 | 5/2003 | Cho et al. |
| 2003/0134200 A1 | 7/2003 | Tanaka et al. |
| 2004/0029008 A1 | 2/2004 | Winterberg et al. |
| 2004/0191633 A1 | 9/2004 | Johnson et al. |
| 2004/0201948 A1 | 10/2004 | Hosoya et al. |
| 2004/0213729 A1 | 10/2004 | Suhara et al. |
| 2004/0253516 A1 | 12/2004 | Yuasa et al. |
| 2004/0258836 A1 | 12/2004 | Besenhard et al. |
| 2005/0026040 A1 | 2/2005 | Thackeray et al. |
| 2005/0074675 A1 | 4/2005 | Nishijima et al. |
| 2005/0130042 A1 | 6/2005 | Liu et al. |
| 2005/0136329 A1 | 6/2005 | Howard et al. |
| 2005/0181279 A1 | 8/2005 | Hosoya |
| 2005/0265909 A1 | 12/2005 | Kajiya et al. |
| 2005/0271948 A1 | 12/2005 | Kang et al. |
| 2006/0024584 A1 | 2/2006 | Kim et al. |
| 2006/0068293 A1 | 3/2006 | Kim et al. |
| 2006/0081818 A1 | 4/2006 | Ito et al. |
| 2006/0088767 A1 | 4/2006 | Li et al. |
| 2006/0099508 A1 | 5/2006 | Thackeray et al. |
| 2006/0159994 A1 | 7/2006 | Dahn et al. |
| 2006/0177739 A1 | 8/2006 | Endo et al. |
| 2006/0194118 A1 | 8/2006 | Yew et al. |
| 2006/0240326 A1 | 10/2006 | Lee et al. |
| 2007/0048619 A1 | 3/2007 | Inda |
| 2007/0117014 A1 | 5/2007 | Saito et al. |
| 2007/0122705 A1 | 5/2007 | Paulsen et al. |
| 2007/0141469 A1 | 6/2007 | Tokunaga et al. |
| 2007/0172739 A1 | 7/2007 | Visco et al. |
| 2007/0202407 A1 | 8/2007 | Eberman et al. |
| 2007/0264573 A1 | 11/2007 | Yamada et al. |
| 2007/0292761 A1 | 12/2007 | Park et al. |
| 2008/0057401 A1 | 3/2008 | Mori et al. |
| 2008/0090150 A1 | 4/2008 | Nakura |
| 2008/0118836 A1 | 5/2008 | Hwang et al. |
| 2008/0118847 A1 | 5/2008 | Jung et al. |
| 2008/0131778 A1 | 6/2008 | Watanabe et al. |
| 2008/0131781 A1 | 6/2008 | Yong et al. |
| 2008/0160415 A1 | 7/2008 | Wakita et al. |
| 2008/0241053 A1 | 10/2008 | Suhara et al. |
| 2008/0268339 A1 | 10/2008 | Suzuki |
| 2008/0280205 A1 | 11/2008 | Jiang et al. |
| 2008/0311473 A1 | 12/2008 | Sasaoka et al. |
| 2008/0318131 A1 | 12/2008 | Watanabe et al. |
| 2009/0087744 A1 | 4/2009 | Jiang |
| 2009/0092903 A1 | 4/2009 | Johnson et al. |
| 2009/0146115 A1 | 6/2009 | Xiao et al. |
| 2009/0200510 A1 | 8/2009 | Watanabe et al. |
| 2009/0202905 A1 | 8/2009 | Morita et al. |
| 2009/0239148 A1 | 9/2009 | Jiang |
| 2010/0055567 A1 | 3/2010 | Nakai et al. |
| 2010/0086853 A1 | 4/2010 | Venkatachalam et al. |
| 2010/0086854 A1 | 4/2010 | Kumar et al. |
| 2010/0151332 A1 | 6/2010 | Lopez et al. |
| 2010/0173197 A1 | 7/2010 | Li et al. |
| 2010/0304225 A1 | 12/2010 | Pascaly et al. |
| 2011/0014518 A1 | 1/2011 | Nakai et al. |
| 2011/0017529 A1 | 1/2011 | Durney |
| 2011/0031437 A1 | 2/2011 | Nagase et al. |
| 2011/0052981 A1 | 3/2011 | Lopez et al. |
| 2011/0052989 A1 | 3/2011 | Venkatachalam et al. |
| 2011/0053001 A1 | 3/2011 | Babic et al. |
| 2011/0065006 A1 | 3/2011 | Ogasa |
| 2011/0076556 A1 | 3/2011 | Karthikeyan et al. |
| 2011/0076564 A1 | 3/2011 | Yu et al. |
| 2011/0081578 A1 | 4/2011 | Chang et al. |
| 2011/0089369 A1 | 4/2011 | Patoux et al. |
| 2011/0111294 A1 | 5/2011 | Lopez et al. |
| 2011/0111298 A1 | 5/2011 | Lopez et al. |
| 2011/0121240 A1 | 5/2011 | Amine et al. |
| 2011/0136019 A1 | 6/2011 | Amiruddin et al. |
| 2011/0143174 A1 | 6/2011 | Kim et al. |
| 2011/0165463 A1 | 7/2011 | Chang et al. |
| 2011/0165474 A1 | 7/2011 | Im et al. |
| 2011/0171371 A1 | 7/2011 | Li et al. |
| 2011/0171539 A1 | 7/2011 | Patoux et al. |
| 2011/0200864 A1 | 8/2011 | Dai |
| 2011/0200880 A1 | 8/2011 | Yu |
| 2011/0223492 A1 | 9/2011 | Sakitani et al. |
| 2011/0244331 A1 | 10/2011 | Karthikeyan et al. |
| 2011/0269018 A1 | 11/2011 | Kono et al. |
| 2011/0291044 A1 | 12/2011 | Wang et al. |
| 2011/0294006 A1 | 12/2011 | Amine et al. |
| 2011/0294019 A1 | 12/2011 | Amine et al. |
| 2012/0015250 A1 | 1/2012 | Teng et al. |
| 2012/0028134 A1 | 2/2012 | Kim et al. |
| 2012/0040247 A1 | 2/2012 | Manivannan et al. |
| 2012/0168696 A1 | 7/2012 | Huang et al. |
| 2012/0196176 A1 | 8/2012 | He et al. |
| 2012/0258369 A1 | 10/2012 | Yokoyama et al. |
| 2012/0282522 A1 | 11/2012 | Axelbaum et al. |

(56) References Cited

U.S. PATENT DOCUMENTS

| | | |
|---|---|---|
| 2012/0295155 A1 | 11/2012 | Deng et al. |
| 2013/0004826 A1 | 1/2013 | Li et al. |
| 2013/0011738 A1 | 1/2013 | Zhou |
| 2013/0101893 A1 | 4/2013 | Dai et al. |
| 2013/0149604 A1 | 6/2013 | Fujiki et al. |
| 2013/0252107 A1 | 9/2013 | Lee et al. |
| 2013/0260249 A1 | 10/2013 | Choi |
| 2013/0344391 A1 | 12/2013 | Yushin et al. |
| 2014/0087065 A1 | 3/2014 | Li et al. |
| 2014/0087254 A1 | 3/2014 | Li et al. |
| 2014/0087256 A1 | 3/2014 | Li et al. |
| 2014/0087261 A1 | 3/2014 | Li et al. |
| 2014/0141331 A1 | 5/2014 | Lee et al. |
| 2014/0158932 A1 | 6/2014 | Sun et al. |
| 2014/0175329 A1 | 6/2014 | De et al. |
| 2014/0193693 A1 | 7/2014 | Hoshina et al. |
| 2014/0234715 A1 | 8/2014 | Fasching et al. |
| 2014/0272563 A1 | 9/2014 | Dai et al. |
| 2014/0272590 A1 | 9/2014 | Zhang et al. |
| 2015/0010819 A1 | 1/2015 | Lee et al. |
| 2015/0024275 A1 | 1/2015 | Ishida et al. |
| 2015/0140421 A1 | 5/2015 | Ihara et al. |
| 2015/0171423 A1 | 6/2015 | Kim et al. |
| 2015/0180024 A1 | 6/2015 | Nose |
| 2015/0243971 A1 | 8/2015 | Cho et al. |
| 2015/0243984 A1 | 8/2015 | Kase et al. |
| 2015/0303519 A1 | 10/2015 | Hanazaki |
| 2015/0311522 A1 | 10/2015 | Fang et al. |
| 2016/0006025 A1 | 1/2016 | Sun |
| 2016/0036043 A1 | 2/2016 | Dai et al. |
| 2016/0133929 A1 | 5/2016 | Hah et al. |
| 2016/0156032 A1 | 6/2016 | Lee et al. |
| 2016/0260965 A1 | 9/2016 | Wu et al. |
| 2016/0293941 A1 | 10/2016 | Yamasaki et al. |
| 2016/0315315 A1 | 10/2016 | Olken et al. |
| 2016/0336584 A1 | 11/2016 | Park et al. |
| 2016/0351973 A1 | 12/2016 | Albano et al. |
| 2017/0018767 A1 | 1/2017 | Park et al. |
| 2017/0092949 A1 | 3/2017 | Dai et al. |
| 2017/0133678 A1 | 5/2017 | Ozoemena et al. |
| 2017/0155145 A1 | 6/2017 | Kusachi et al. |
| 2017/0187071 A1 | 6/2017 | Wang et al. |
| 2017/0187072 A1 | 6/2017 | Wang et al. |
| 2017/0214045 A1 | 7/2017 | Dai et al. |
| 2017/0263917 A1 | 9/2017 | Dai et al. |
| 2017/0263928 A1 | 9/2017 | Dai et al. |
| 2017/0263929 A1 | 9/2017 | Wu et al. |
| 2017/0279162 A1 | 9/2017 | Vissers et al. |
| 2017/0346082 A1 | 11/2017 | Dai et al. |
| 2018/0062156 A1 | 3/2018 | Wu et al. |
| 2018/0062170 A1 | 3/2018 | Lopez et al. |
| 2018/0079655 A1 | 3/2018 | Dai et al. |
| 2018/0083277 A1 | 3/2018 | Dai et al. |
| 2018/0083278 A1 | 3/2018 | Dai et al. |
| 2018/0114983 A9 | 4/2018 | Dai et al. |
| 2018/0114984 A9 | 4/2018 | Wu et al. |
| 2018/0123117 A9 | 5/2018 | Dai et al. |
| 2018/0215629 A1 | 8/2018 | Honma et al. |
| 2018/0257947 A9 | 9/2018 | Dai et al. |
| 2018/0294522 A1 | 10/2018 | Dai et al. |
| 2018/0331360 A1 | 11/2018 | Meng et al. |
| 2018/0351173 A1 | 12/2018 | Dai et al. |
| 2019/0027747 A9 | 1/2019 | Dai et al. |
| 2019/0051893 A1 | 2/2019 | Zhang et al. |
| 2019/0067686 A1 | 2/2019 | Dai et al. |
| 2019/0074514 A1 | 3/2019 | Wu et al. |
| 2020/0035991 A1 | 1/2020 | Wang et al. |
| 2020/0044242 A1 | 2/2020 | Wang et al. |
| 2020/0075951 A1 | 3/2020 | Dai et al. |
| 2020/0189930 A1 | 6/2020 | Dai et al. |
| 2020/0259208 A1 | 8/2020 | Yamamoto |
| 2020/0266435 A1 | 8/2020 | Dai et al. |
| 2020/0358093 A1 | 11/2020 | Oshita et al. |

FOREIGN PATENT DOCUMENTS

| | | | |
|---|---|---|---|
| CN | 1770514 A | 5/2006 | |
| CN | 101083321 A | 12/2007 | |
| CN | 101088918 A | 12/2007 | |
| CN | 101150190 A | 3/2008 | |
| CN | 101223660 A | 7/2008 | |
| CN | 101284681 A | 10/2008 | |
| CN | 101304090 A | 11/2008 | |
| CN | 101510603 A | 8/2009 | |
| CN | 101694877 A | 4/2010 | |
| CN | 101734728 A | 6/2010 | |
| CN | 101789499 A | 7/2010 | |
| CN | 102110808 A | 6/2011 | |
| CN | 102195094 A | 9/2011 | |
| CN | 102299299 A | 12/2011 | |
| CN | 102332585 A | 1/2012 | |
| CN | 102368548 A | 3/2012 | |
| CN | 102386381 A | 3/2012 | |
| CN | 102439765 A | 5/2012 | |
| CN | 102479947 A | 5/2012 | |
| CN | 102484249 A | 5/2012 | |
| CN | 102544575 A | 7/2012 | |
| CN | 102646831 A | 8/2012 | |
| CN | 102683666 A | 9/2012 | |
| CN | 102723459 A | 10/2012 | |
| CN | 102751481 A | 10/2012 | |
| CN | 102881891 A | 1/2013 | |
| CN | 103151520 A | 6/2013 | |
| CN | 103296249 A | 9/2013 | |
| CN | 103560250 A | 2/2014 | |
| CN | 103606674 A | 2/2014 | |
| CN | 103682311 A | 3/2014 | |
| CN | 103872302 A | 6/2014 | |
| CN | 103872315 A | 6/2014 | |
| CN | 103972493 A | 8/2014 | |
| CN | 104022280 A | 9/2014 | |
| CN | 104201323 A | 12/2014 | |
| CN | 104300138 A | 1/2015 | |
| CN | 104466099 A | 3/2015 | |
| CN | 104577128 A | 4/2015 | |
| CN | 104685677 A * | 6/2015 | ........... C01G 31/006 |
| CN | 104868122 A | 8/2015 | |
| CN | 104966833 A | 10/2015 | |
| CN | 105161710 A | 12/2015 | |
| CN | 105895909 A | 8/2016 | |
| CN | 106450211 A | 2/2017 | |
| DE | 10352063 A1 | 6/2005 | |
| JP | 04-267053 A | 9/1992 | |
| JP | 10-087327 A | 4/1998 | |
| JP | 2001-167763 A | 6/2001 | |
| JP | 2001-319652 A | 11/2001 | |
| JP | 2002-201028 A | 7/2002 | |
| JP | 2004-047180 A | 2/2004 | |
| JP | 2005-101003 A | 4/2005 | |
| JP | 2005-149867 A | 6/2005 | |
| JP | 2005-289700 A | 10/2005 | |
| JP | 2005-302507 A | 10/2005 | |
| JP | 2006-173137 A | 6/2006 | |
| JP | 2006-344509 A | 12/2006 | |
| JP | 2007-091502 A | 4/2007 | |
| JP | 2007-517368 A | 6/2007 | |
| JP | 2007-173113 A | 7/2007 | |
| JP | 2009-004311 A | 1/2009 | |
| JP | 2009-217981 A | 9/2009 | |
| JP | 2010-541166 A | 12/2010 | |
| JP | 2011-105594 A | 6/2011 | |
| JP | 2011-113869 A | 6/2011 | |
| JP | 2013-180917 A | 9/2013 | |
| JP | 5369568 B2 | 12/2013 | |
| JP | 2015-213038 A | 11/2015 | |
| JP | 2016-517615 A | 6/2016 | |
| JP | 2017-191738 A | 10/2017 | |
| KR | 10-2002-0063501 A | 8/2002 | |
| KR | 10-2005-0121727 A | 12/2005 | |
| KR | 10-2014-0073856 A | 6/2014 | |
| KR | 10-2014-0108615 A | 9/2014 | |
| KR | 10-2016-0010313 A | 1/2016 | |
| KR | 10-1731473 B1 | 4/2017 | |

(56) References Cited

FOREIGN PATENT DOCUMENTS

| TW | 201126798 A | 8/2011 |
|---|---|---|
| TW | 201311545 A | 3/2013 |
| TW | 201342695 A | 10/2013 |
| WO | 03/49216 A1 | 6/2003 |
| WO | 03/81698 A1 | 10/2003 |
| WO | 2004/045015 A1 | 5/2004 |
| WO | 2004/102700 A1 | 11/2004 |
| WO | 2004/107480 A2 | 12/2004 |
| WO | 2008/069351 A1 | 6/2008 |
| WO | 2009/120515 A1 | 10/2009 |
| WO | 2010/011569 A1 | 1/2010 |
| WO | 2010/139404 A1 | 12/2010 |
| WO | 2011/020073 A1 | 2/2011 |
| WO | 2011/054441 A1 | 5/2011 |
| WO | 2013/048048 A2 | 4/2013 |
| WO | 2014/014913 A2 | 1/2014 |
| WO | 2014/119165 A1 | 8/2014 |
| WO | 2016/143572 A1 | 9/2016 |
| WO | 2019/211366 A1 | 11/2019 |

OTHER PUBLICATIONS

"Award Details," SBIR/STTR, www.sbir.gov/sbirsearch/detail/233700, accessed Sep. 8, 2011.

Abu-Lebdeh et al., High-Voltage Electrolytes Based on Adiponitrile for Li-Ion Batteries, Journal of the Electrochemical Society, 2009, vol. 156, No. 1, pp. A60-A65.

Amiruddin et al.; "Electrochemical Characterization of Cathode Material (Li[Ni0.8Co0.1 Mn0.1]O2 as Core and Li[Ni0.5-0.5xCoxMn0.5-0.5x]O2 as shell)for Lithium-Ion Batteries"; ECS Meeting Abstracts; Electrochemical Society; No. 240; 2007; one page.

Arunkumar et al., "Chemical and structural instability of the chemically delithiated (1-z) Li[Li1/3Mn2/3O2 (z) Li[Co1-yNiy]O2 (0=y=1 and O=z=1) solid solution cathodes,"Journal of Materials Chemistry, 2008, vol. 18, pp. 190-198.

Ben Kamel et al, "Local Structure and electrochemistry of LiNiyMnyCo1-2y)O2 electrode materials for Li-ion batteries," Ionics, 2008, vol. 14, No. 2, pp. 89-97.

Bentaleb et al., "On the LiNi0.2Mn0.2Co0.6O2 positive electrode material," Journal of Power Sources, 2010, vol. 195, No. 5, pp. 1510-1515.

Cerion Power, "Our Power Business," www.cerionenterprises.com/companies_and_applications/power, accessed Sep. 8, 2011.

Chen et al., "Role of surface coating on cathode materials for lithium-ion batteries," Journal of Materials Chemistry, 2010, 20, 7606-7612.

Cho et al., "Exploring Lithium Deficiency in Layered Oxide Cathode for Li-Ion Battery," Advanced Sustainable Systems, 2017, 1700026, 10 pages.

Cho et al., "LiCoO2 Cathode Material That Does Not Show a Phase Transition from Hexagonal to Monoclinic Phase," 2001, Journal of The Electrochemical Society, vol. 148, No. 10, pp. A1110-A1115.

Choi et al., "M27 Al NMR Chemical Shifts in Oxide Crystals: A First-Principles Study," J. Phys. Chem. C, 2009, 113 (9), pp. 3869-3873.

David Howell, US Department of Energy, "Vehicle Technologies Program," 2011 Annual Merit Review and Peer Evaluation Meeting, Presentation, May 9-13, 2011.

Davison et al., "Low Cost, Novel Methods for Fabricating All-Solid-State Lithium Ion Batteries," A Major Qualifying Project Submitted to the Faculty of Worcester Polytechnic Institute, Apr. 23, 2012, 126 pages.

Dou et al., "Synthesis and electrochemical properties of layered LiNi0.5-xMn0.5-xCo2xO2 for lithium-ion battery from nickel manganese cobalt precursor," J Solid State Electrochem, (2011), vol. 15, pp. 399-404.

ETV Motors, "High5ive advanced high-voltage cells," www.etvemotors.com/advanced-battery.htm, accessed Sep. 8, 2011.

Fergus et al., "Recent Developments in Cathode Materials for Lithium Ion Batteries," Journal of Power Sources, Vo. 195, No. 4, 23010, pp. 939-954.

Fey et al., Preparation and electrochemical properties of high-voltage cathode maters, LiMyNi0.5-yMn1.5O4 (M=Fe, Cu, Al, Mg; y=0.0-0.4), Journal of Power Sources, 2003, vol. 115, pp. 332-345.

Franger et al., "Chemistry and Electrochemistry of Low-Temperature Manganese Oxides as Lithium Intercalation Compounds," Journal of The Electrochemical Society, 2000, vol. 147, No. 9, pp. 3226-3230.

Ghosh et al., "Block Copolymer Solid Battery Electrolyte with High Li-Ion Transference Number," Journal of the Electrochemical Society, 2010, vol. 157, No. 7, pp. A846-A849.

Gille G. et al., "Cathode Materials for Rechargeable Batteries-Preparation, Structure-Property Relationships and Performance," Solid State Ionics, Vo. 148, No. 3-4, 2002, pp. 269-282.

Giordano et al., "Metal Nitride and Metal Carbide Nanoparticles by a Soft Urea Pathway," Chem. Mater., 2009, vol. 21, pp. 5136-5144.

Han et al., "Understanding the Role of Temperature and Cathode Composition on Interface and Bulk: Optimizing Aluminum Oxide Coatings for Li-Ion Cathodes," ACS Appl. Mater. Interfaces, 2017, 9 (17), pp. 14769-14778.

Hu et al., "Enhanced electrochemical performance of LiMn2O4 cathode with a Li0.34La0.51TiO3-caoted layer," RSC Advances, 2015. vol. 5, pp. 17592-17600.

Hu et al., "Ni, Mn—Co doped High-Voltage LiCoO2 Cathode Material for Lithium Ion Batteries," Chinese Journal of Inorganic Chemistry, 2015, vol. 31, Issue 1, pp. 159-165.

Huang et al., "Lithium cobalt phosphate: a high voltage lithium ion cathode material," Valence Technologies.

Jin et al., "Observation of Bulk Superconductivity in NaxCoO-2 yH2O and NaxCoO-2-yD2O Powder and Single Crystals," Phys Rev Lett, 2008, vol. 91, Issue 21, id. 217001, 4 pages.

Jow et al., "High Voltage Electrolytes for Li-ion Batteries," U.S. Research Laboratory, Presentation, May 2011.

Ju et al., "LiCo1-xAlxO2 (O=x=0.05) cathode powders prepared from the nanosized Co1-xAlxOy precursor powders," Materials Chemistry and Physics, 112 (2008), pp. 536-541.

Jung et al., "Enhanced Stability of LiCoO2 Cathodes in Lithium-Ion Batteries Using Surface Modification by Atomic Layer Deposition," 2010, Journal of The Electrochemical Society, vol. 157, No. 1, pp. A75-A81.

Kawai et al., "High-voltage lithium cathode materials," Journal of Power Sources, 1999, vols. 81-82, abstract only.

Kim et al., "Effect of fluorine on Li[Ni1/3Co1/3Mn1/3]O2-zFz as lithium intercalation material," Journal of Power Sources, 2005, vol. 146, pp. 602-605.

Kim et al., "Improvement of High-Voltage Cycling Behavior of Surface-Modified Li[Ni1/3Co1/3Mn1/3]O2 Cathodes by Fluorine Substitution for Li-Ion Batteries," J. Electrochem. Soc., 2005, vol. 152, issue 9, pp. A1707-A1713.

Kobayashi et al., "Study on the Crystal and Electronic Structures of the Layered Li2Mo3—LiMo2 Materials in Li De-Intercalation Process," Photon Factory Activity Report, 2012, vol. 29, No. 2011, 1 pp.

Koyama et al., "First principles study of dopant solubility and defect chemistry in Li CoO2," J. Mater. Chem A., 2014, vol. 2, pp. 11235-11245.

Iddir et al., "Stability of Li- and Mn-Rich Layered-Oxide Cathodes within the First-Charge Voltage Plateau," Journal of the Electrochemical Society, 2016, vol. 163, No. 8, pp. A1784-A1789.

Lee et al., "Characteristics of LiCoO2 and Its Precursor Synthesized by a Uniform Precipitation Method," Electrochemical and Solid-State Letters, 2010, vol. 13, No. 7, pp. A81-A84.

Lee et al., "Solid-state NMR Studies of Al-doped and Al2O3-coated LiCoO2," Electrochimica Acta, Nov. 30, 2004, vol. 50, Issues 2-3, pp. 491-494.

Lee et al., "Surface modification of LiNi0.5Mn1.5O4 cathodes with ZnAl2O4 by a sol-gel method for lithium ion batteries," Electrochimica Acta, 2014, vol. 115, pp. 326-331.

(56) References Cited

OTHER PUBLICATIONS

Lee et al., "The Effect of Coating Thickness on the Electrochemical Properties of a Li—La—Ti—O-coated Li[Ni0.3Co0.4Mn0.3]O2 Cathode," Bull. Korean Chem. Soc., 2010, vol. 31, No. 11, pp. 3233-3237.
Lee et al., "The Effects of Li—La—Ti—O Coating on the Properties of Li[Ni0.3Co0.4Mn0.3]02 Cathode Material," Journal of the Korean Institute of Electrical and Electronic Material Engineers, Oct. 2009, vol. 22, No. 10, pp. 890-896.
Levasseur et al., "Evidence for structural defects in on-stoichiometric HT-LiCoO2: electrochemical, electronic properties and ?LI NMR studies," Solid State Ionics, 128 (2000), 00. 11-24.
Li et al., "Effects of fluorine doping on structure, surface chemistry, and electrochemical performance of LiNi0.8Co0.15Al0.05O2," Electrochimica Acta, 2015, vol. 174, pp. 1122-1130.
Li, "Layered Oxides Li1+xM1-x02 (M=Ni, Mn, Co, Al) as Cathode Materials for Rechargeable Lithium Ion Batteries," Dissertation, Submitted in partial fulfillment of the requirements for the degree of Doctor of Philosophy in Materials Science and Engineering in the Graduate School of Binghamton University State University of New York, Jul. 22, 2011, Published by UMI Dissertation Publishing, UMI No. 3474185, 158 pages.
Liu et al., "Investigation the electrochemical performance of Li1.2Ni0.2Mn0.6O2 cathode material with ZnAl2O4 coating for lithium ion batteries," Journal of Alloys and Compounds, 2016, vol. 685, pp. 523-532.
Lu et al., "Layered Li[NixCo1-2 xMnx]O2 Cathode Materials for Lithium-Ion Batteries," Electrochemical and Solid-State Letters, 2001, vol. 4, No. 12, pp. A200-A203.
Lucht, University of Rhode Island, "Development of Electrolytes for Lithium-ion Batteries," Presentation, May 11, 2001.
Manthiram Lab Highlights, "Passivation of Spinel Cathode Surface through Self-Segregation of Iron," May 7, 2010.
Menetrier et al., "The insulator-metal transition upon lithium deintercalation from LiCoO2: electronic properties and Li-7 NMR Study," Journal of Materials Chemistry, 1999, vol. 9, No. 5, pp. 1135-1140.
Myung et al., "Functionality of Oxide Coating for Li[Li0.05Ni0.4Co0.15Mn0.4])2 as Positive Electrode Materials for Lithium-Ion Secondary Batteries," J. Phys. Chem. C, 2007, vol. 111, pp. 4061-4067.
Myung et al., "Role of Alumina Coating on Li—Ni—Co—Mn—O Particles as Positive Electrode Material for Lithium-Ion Batteries," Chem. Mater., 2005, vol. 17, pp. 3695-3704.
Nam et al. "Ammonia-free coprecipitation synthesis of a Ni—Co—Mn hydroxide precursor for high-performance battery cathode materials," Green Chemistry, 2015. vol. 17, pp. 1127.
Patoux et al., "Layered Manganese Oxide Intergrowth Electrodes for Rechargeable Lithium Batteries. 2. Substitution with Al," Chem. Mater., 2005, vol. 17, pp. 1044-1054.
Periasamy et al., "High Voltage and High Capacity Characteristics of LiNi1/3Co1/3Mn1/3O2 Cathodes for Lithium Battery Applications," Int. J. Electrochecm Soc., vol. 2, 2007, pp. 689-699.
Qian et al., "Lithium Lanthanum Titanium Oxides: A Fast Ionic Conductive Coating for Lithium-Ion Battery Cathodes," Chemistry of Materials, 2012, 24 (14), pp. 2744-2751.
Reddy et al., "Effects of LLTO coating on high temperature cycle life performance of LiMn2O4 cathode material," Abstract #382, 2012, The Electrochemical Society, 2 pages.
Robertson et al., "Layered LixMn1-yCoyO2 Intercalation Electrodes-Influence of Ion Exchange on Capacity and Structure upon Cycling," Chem. Mater., 2001, vol. 13, pp. 2380-2386.
Rodrigues et al., "A novel coprecipitation method towards the synthesis of NiXMnXCo(1-2X)(OH)2 for the preparation of lithium metal oxides," J Solid State Electrochem, 2012, vol. 16, pp. 1121-1132.
Rouse et al., "Electrochemical Studies of Single Crystals of Lithiated Nickel Oxide," Journal of The Electrochemical Society, Feb. 1966, vol. 113, No. 2, pp. 184-190.

Saadoune et al., "LiNi0.1Mn0.1Co0.8O2 electrode material: Structural changes upon lithium electrochemical extraction," Electrochimica Acta, 2010, vol. 55, No. 18, pp. 5180-5185.
Seong-Min Bak et al, "Structural Changes and Thermal Stability of Charged LiNixMnyCozO2 Cathode Materials Studied by Combined In Situ Time-Resolved XRD and Mass Spectroscopy," ACS Appl. Mater. Interfaces, 2014, vol. 6, pp. 22594-22601.
Shinova et al., "Cationic distribution and electrochemical performance of LiCo1/3Ni1/3Mn1/3O2 electrodes for lithium-ion batteries," 2008, Solid State Ionics, vol. 179, pp. 2198-2208.
Stoyanova et al., "High-Frequency Electron Paramagnetic Resonance Analysis of the Oxidation State and Local Structure of Ni and Mn Ions in Ni,Mn-Codoped LiCoO2," Inorganic Chemistry, 2010, vol. 49, No. 4, pp. 1932-1941.
Sullivan, "Safe High Voltage Cathode Materials for Pulsed Power Applications," Navy STTR FY2011A—Topic N11A-T035, www.navy.sbir.com/n11_A/navst11-035.htm, accessed Sep. 8, 2011.
Sun et al., "The Role of AlF3 Coatings in Improving Electrochemical Cycling of Li-Enriched Nickel-Manganese Oxide Electrodes for Li-Ion Batteries," Adv. Mater., 2012, vol. 24, pp. 1192-1196.
Tang et al., "Synthesis and characterization of LiFePO4 coating with aluminum doped zinc oxide," Trans. Nonferrous Met. Soc. China, 2013, vol. 23, pp. 451-455.
Wang et al., "Effect of surface fluorine substitution on high voltage electrochemical performances of layered LiNi0.5Co0.2Mn0.3O2 cathode materials," Applied Surface Science, 2016, vol. 371, pp. 172-179.
Wang et al., "Synthesis of Li2MnO3-stabilized LiCoO2 cathode material by spray-drying method and its high voltage performance," Journal of Alloys and Compounds, 2015, vol. 626, pp. 228-233.
Wenbin, Luo, "Effect of Al, Mg and Mn—Mg Doping on the Structure, Electrochemistry and Thermal Stability of LiCoO2 and LiNi1/3Mn1/3Co1/3O2," China Doctoral Dissertations Full-text Database Engineering Technology Part II, Nov. 15, 2010. (Translation provided by Multiling).
Wolfenstine et al., US Army RDECOM, "High Cycle Life Cathode for High Voltage (5V) Lithium Ion Batteries."
Wu et al., "Effect of Al3+ and F– Doping on the Irreversible Oxygen Loss from Layered Li[Li0. 17Mn0.58Ni0.25]O2 Cathodes," Electrochemical and Solid-State Letters, 2007, vol. 10, No. 6, pp. A151-A154.
Xie et al., "An improved continuous co-precipitation method to synthesize LiNi0.80Co0.15Al0.05O2 cathode material," Journal of Alloys and Compounds, 2016, vol. 666, pp. 84-87.
Xinran, Cui, "Preparation and Properties of Al(3+) Doped Lithium-rich Layered Cathode Material Li[Co0.3Li0.23Mn0.47]O2," China Doctoral Dissertations Full-text Database Engineering Technology Part II, Oct. 15, 2012. (Translation provided by Multiling).
Xu, US Army RDECOM, "Electrolyte for Next Generation 5V Li-Ion Batteries."
Yue et al., "The enhanced electrochemical performance of LiNi0.6Co0.2Mn0.2O2 cathode materials by low temperature fluorine substitution," Electrochimica Acta, 2013, vol. 95, pp. 112-118.
Yuping et al.; "Lithium Ion Batteries—Applications and Practices"; Chapter 5 Cobalt Lithium Oxide Cathode Materials; Chemical Industry Press; Jan. 2012; 4 pages.
Zeng et al, "Investigation of the Structural Changes in Li[NiyMnyCo(1-2y]O-2 (y=0.05) upon Electrochemical Lithium Deintercalation," Chemistry of Materials, 2010, vol. 22, No. 3, pp. 1209-1219.
Zeng et al., "Cation ordering in Li[NixMnxCo(1-2x)]O-2-layered cathode materials: A nuclear magnetic resonance (NMR), pair distribution function, X-ray absorption spectroscopy, and electrochemical study," Chemistry of Materials, 2007, vol. 19. No. 25, pp. 6277-6289.
Zhang et al, Argonne National Laboratory, Vehicle Technologies Program Annual Merit Review and Peer Evaluation Meeting, "High Voltage Electrolyte for Lithium Batteries," Presentation, Jun. 9-13, 2011.
Zhao et al., "Progress of Research on the Li-rich Cathode Materials xLi2MnO3(1-x)LiMO2(M+Co, Fe, Ni1/2Mn1/2 . . . ) for Li-ion Batteries," Journal of Inorganic Materials, vol. 26(7), pp. 673-679, Jul. 2011.

(56) References Cited

OTHER PUBLICATIONS

Deng et al.; "Safety influences of the Al and Ti elements modified LiCoO2 materials on LiCoO2/graphite batteries under the abusive conditions"; Electrochimica Acta; vol. 295; 2019; p. 703-709.
"Cathode"; https://web.archive.org/web/20180309000906/http://lithiumionbattery.org:80/activities/cathode; Li-ion Battery; copyright 2017; accessed Jul. 12, 2023; 4 pages.

\* cited by examiner

COATINGS FOR CATHODE ACTIVE MATERIALS

CROSS-REFERENCE TO RELATED PATENT APPLICATIONS

This patent application is a divisional of U.S. application Ser. No. 16/531,883, entitled "COATINGS FOR CATHODE ACTIVE MATERIALS," filed Aug. 5, 2019, which claims the benefit under 35 U.S.C. § 119 (e) of U.S. Patent Application Ser. No. 62/765,116, entitled "COATINGS FOR CATHODE ACTIVE MATERIALS," filed on Aug. 17, 2018. The above-identified applications are incorporated herein by reference in their entireties.

U.S. GOVERNMENT LICENSE RIGHTS

This invention was made with U.S. government support under WFO Proposal No. 85F59. This invention was made under a CRADA 1500801 between Apple Inc. and Argonne National Laboratory operated for the United States Department of Energy. The U.S. government has certain rights in the invention.

FIELD

This disclosure relates generally to batteries, and more particularly, to cathode active materials for lithium-ion batteries.

BACKGROUND

A commonly used type of rechargeable battery is a lithium battery, such as a lithium-ion (Li-ion) or lithium-polymer battery. As battery-powered devices become increasingly small and more powerful, batteries powering these devices need to store more energy in a smaller volume. Consequently, use of battery-powered devices may be facilitated by mechanisms for improving the volumetric energy densities of batteries in the devices.

Lithium cobalt oxides and lithium transition metal oxides can be used in cathode active materials for lithium-ion batteries. The lithium transition metal oxides are derivatives of lithium cobalt oxide. The lithium cobalt oxides or lithium transition metal oxides can be in the form of powder.

In lithium-ion batteries, the cathode materials of different compositions tend to react chemically or electrochemically with the liquid electrolyte that consists of a lithium salt ($LiPF_6$) in organic solvents (such as ethylene carbonate, ethyl-methylene carbonate), especially when Li is extracted from the cathodes during charging. This is one of the major reasons for causing short cycle life of the batteries.

Although the lithium-ion cathode may have a crystal structure stabilized for charge and discharge cycling, the lithium-ion cathode is chemically reactive with a liquid electrolyte, which includes a lithium salt (e.g. $LiPF_6$) in an organic solvent (e.g. ethylene carbonate), especially when Li is extracted from the cathode during charging.

A coating, such as aluminum oxide ($Al_2O_3$) or aluminum fluoride ($AlF_3$), is typically applied to the cathode particles to prevent dissolution of the transition metals from the cathodes into the electrolyte. However, the aluminum oxide coating often causes energy density loss for the battery. There remains a need to develop coatings for improved battery performance.

SUMMARY

In one aspect, the disclosure is directed to a cathode active material comprising a plurality of cathode active compound particles and a coating disposed over each of the cathode active compound particles. The coating can comprise a lithium (Li)-ion conducting oxide containing lanthanum (La) and titanium (Ti). In some variations, the coating comprises a Perovskite $La_{2/3-x}Li_{3x}TiO_3$.

In another aspect, the disclosure is directed to a cathode active material comprising a plurality of cathode active compound particles and a coating disposed over each of the cathode active compound particles. The coating can comprise a lithium (Li) ion conducting oxide containing lithium (Li), lanthanum (La), and Germanium (Ge). The conductivity of the conductive oxide can be controlled by the ratio of La to Li. In some variations, the conducting oxide comprises a Perovskite $La_{2/3-x}Li_{3x}GeO_3$.

The disclosure is directed to a battery cell comprising an anode comprising an anode current collector and a cathode described herein. A separator is disposed between the anode and the cathode.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

The following description is presented to allow any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Thus, the disclosure is not limited to the embodiments shown, but is to be accorded the widest scope consistent with the principles and features disclosed herein.

As used herein, all compositions referenced for cathode active materials represent those of as-prepared materials (i.e., "virgin" materials) unless otherwise indicated. Materials of these compositions have not yet been exposed to additional processes, such as de-lithiation and lithiation during, respectively, charging and discharging of a lithium-ion battery.

Overview

The performance of batteries can be improved using coatings that provide improved average voltage and energy retention. These and other needs are addressed by the disclosure herein.

The disclosure provides a combination of surface coating and lithium-ion cathode materials that can demonstrate improved average voltage and cycle retention over a conventional alumina coating. The disclosure provides the use of lithium-ion oxide containing lanthanum and titanium (LLTO) or lithium-ion oxide containing lanthanum and germanium (LLGO) as lithium-ion conducting coatings for lithium substituted-cobalt oxide based cathode materials. Cathode active materials (e.g. substituted $LiCoO_2$ cathode materials) coated with the LLTO or LLGO can provide an increased average voltage and an improved energy retention over the conventional alumina coating.

The stabilization of lithium cobalt oxides ($LiCoO_2$) may require the substitution of elements that mitigate degradation mechanisms, and may allow for more lithium to be extracted and re-inserted reversibly at higher operating voltages and temperatures.

In three recent patent publications, US 2017/0263929 A1, US 2017/0263928 A1, and US 2017/0263917 A1, each entitled "CATHODE ACTIVE MATERIALS FOR LITHIUM-ION BATTERIES," elemental substitutes for cobalt, such as manganese and aluminum, have been shown to stabilize the crystal structure. Each of the foregoing patent publications is incorporated herein by reference in its entirety.

Figure 1:
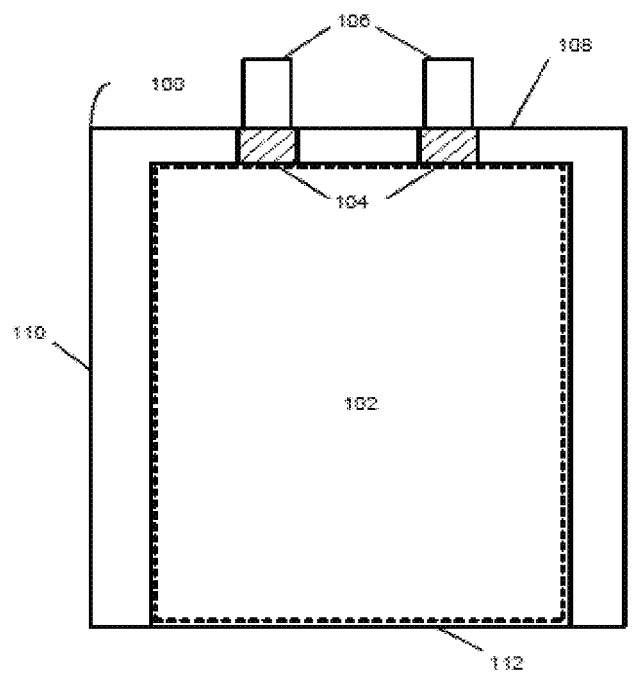
FIG. 1 is a top-down view of a battery cell in accordance with an illustrative embodiment.

FIG. 1 presents a top-down view of a battery cell 100 in accordance with an embodiment. The battery cell 100 may correspond to a lithium-ion or lithium-polymer battery cell that is used to power a device used in a consumer, medical, aerospace, defense, and/or transportation application. The battery cell 100 includes a stack 102 containing a number of layers that include a cathode with a cathode active material, a separator, and an anode with an anode active material. More specifically, the stack 102 may include one strip of cathode active material (e.g., aluminum foil coated with a lithium compound) and one strip of anode active material (e.g., copper foil coated with carbon). The stack 102 also includes one strip of separator material (e.g., conducting polymer electrolyte) disposed between the one strip of cathode active material and the one strip of anode active material. The cathode, anode, and separator layers may be left flat in a planar configuration or may be wrapped into a wound configuration (e.g., a "jelly roll").

Enclosures can include, without limitation, pouches such as flexible pouches, rigid containers and the like. Returning to FIG. 1, during assembly of the battery cell 100, the stack 102 is enclosed in an enclosure. The stack 102 may be in a planar or wound configuration, although other configurations are possible. Enclosures can include, without limitation, pouches, such as flexible pouches, rigid containers, and the like. Flexible pouches can be formed by folding a flexible sheet along a fold line 112. For example, the flexible sheet may be made of aluminum with a polymer film, such as polypropylene. After the flexible sheet is folded, the flexible sheet can be sealed, for example, by applying heat along a side seal 110 and along a terrace seal 108. The flexible pouch may be less than 120 microns thick to improve the packaging efficiency of the battery cell 100, the density of battery cell 100, or both.

The stack 102 can also include a set of conductive tabs 106 coupled to the cathode and the anode. The conductive tabs 106 may extend through seals in the pouch (for example, formed using sealing tape 104) to provide terminals for the battery cell 100. The conductive tabs 106 may then be used to electrically couple the battery cell 100 with one or more other battery cells to form a battery pack.

Batteries can be combined in a battery pack in any configuration. For example, the battery pack may be formed by coupling the battery cells in a series, parallel, or a series-and-parallel configuration. Such coupled cells may be enclosed in a hard case to complete the battery pack, or may be embedded within an enclosure of a portable electronic device, such as a laptop computer, tablet computer, mobile phone, personal digital assistant (PDA), digital camera, and/or portable media player.

Figure 2A:
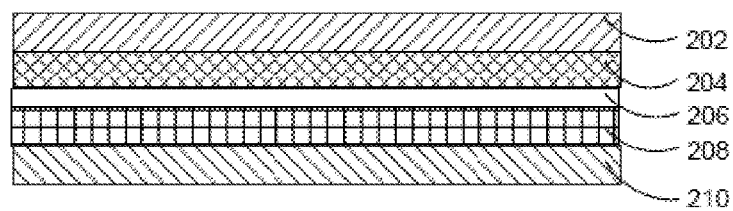
FIG. 2A is a side view of a set of layers for a battery cell in accordance with an illustrative embodiment.

FIG. 2A presents a side view of a set of layers for a battery cell (e.g., the battery cell 100 of FIG. 1) in accordance with the disclosed embodiments. The set of layers may include a cathode current collector 202, a cathode active material 204, a separator 206, an anode active material 208, and an anode current collector 210. The cathode current collector 202 and the cathode active material 204 may form a cathode for the battery cell, and the anode current collector 210 and the anode active material 208 may form an anode for the battery cell. To create the battery cell, the set of layers may be stacked in a planar configuration, or stacked and then wrapped into a wound configuration.

As mentioned above, the cathode current collector 202 may be aluminum foil, the cathode active material 204 may be a lithium compound, the anode current collector 210 may be copper foil, the anode active material 208 may be carbon, and the separator 206 may include a conducting polymer electrolyte.

The cathode active materials described herein can be used in conjunction with any battery cells or components thereof known in the art. For example, in addition to wound battery cells, the layers may be stacked and/or used to form other types of battery cell structures, such as bi-cell structures. All such battery cell structures are known in the art.

Figure 2B:
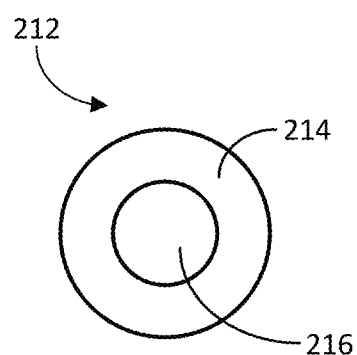
FIG. 2B is a sectional view of a coated particle including a cathode active compound particle and a coating in accordance with an illustrative embodiment.

In further variations, a cathode active material comprises a cathode active compound particle and a coating. FIG. 2B is a sectional view of a coated particle including a cathode active particle and a coating in accordance with an illustrative embodiment. As shown, a coated cathode active compound particle 212 can include a cathode active compound particle or a cathode active compound particle 216 and an coating 214.

The coating can be an oxide material. In some variations, the coating may be a layer of material in contact with a surface of the cathode active compound particle or a reaction layer formed along the surface of the cathode active compound particle. In some variations, the coating can include a lithium-ion conducting oxide containing lanthanum and titanium (LLTO). In some variations, the coating can include a lithium-ion conducting oxide containing lanthanum and germanium (LLGO).

In various embodiments, the performance of batteries including the cathode active material can increase battery capacity and/or reduce the loss of available power in a fully charged battery over time.

The coating can be in any amount known in the art. In some variations, the amount of coating may be less than or equal to 7 wt. % of the total particle. In some variations, the amount of coating may be less than or equal to 5 wt. % of the total particle. In some variations, the amount of coating may be less than or equal to 0.8 wt. % of the total particle. In some variations, the amount of coating may be less than or equal to 0.6 wt. % of the total particle. In some variations, the amount of coating may be less than or equal to 0.4 wt. % of the total particle. In some variations, the amount of coating may be less than or equal to 0.3 wt. % of the total particle. In some variations, the amount of coating may be less than or equal to 0.2 wt. % of the total particle. In some variations, the amount of coating may be less than or equal to 0.1 wt. % of the total particle. In various aspects, the amount can be chosen such that a capacity of the cathode active material is not negatively impacted.

In some variations, the amount of coating may be equal to or greater than 0.02 wt. % of the total particle. In some variations, the amount of coating may be equal to or greater than 0.03 wt. % of the total particle. In some variations, the amount of coating may be equal to or greater than 0.04 wt. % of the total particle. In some variations, the amount of coating may be equal to or greater than 0.05 wt. % of the total particle. In some variations, the amount of coating may be equal to or greater than 0.06 wt. % of the total particle. In some variations, the amount of coating may be equal to or greater than 0.07 wt. % of the total particle. In some variations, the amount of coating may be equal to or greater than 0.08 wt. % of the total particle. In some variations, the amount of coating may be equal to or greater than 0.09 wt. % of the total particle. In some variations, the amount of coating may be equal to or greater than 0.1 wt. % of the total particle. In some variations, the amount of coating may be equal to or greater than 0.2 wt. % of the total particle. In some variations, the amount of coating may be equal to or greater than 0.3 wt. % of the total particle. In some variations, the amount of coating may be equal to or greater than 0.4 wt. % of the total particle.

The coating may include multiple layers of coating material. The coating may also be a continuous coating or a discontinuous coating. Non-limiting examples of discontinuous coatings include coatings with voids or cracks and coatings formed of particles with gaps therebetween. Other types of discontinuous coatings are possible.

A coated powder comprising the coated particles described herein can be used as a cathode active material in a lithium-ion battery. Such cathode active materials can tolerate voltages equal to or higher than conventional materials (i.e., relative to a Li/Li$^+$ redox couple) without capacity fade. Capacity fade degrades battery performance and may result from a structural instability of the cathode active material, a side reaction with electrolyte at high voltage, surface instability, dissolution of cathode active material into the electrolyte, or some combination thereof.

In various aspects, the cathode active materials described herein can result in lithium ion batteries that can be charged at high voltages without capacity fade. Without wishing to be held to a specific mechanisms or mode of action, the compounds may impede or retard structural deviations from an α-NaFeO$_2$ crystal structure during charging to at higher voltages.

Batteries having cathode active materials that include the disclosed coatings can show improved the battery performance. For example, the LLTO or LLGO coatings provide for an increased rate capability and stability over cycles.

LLTO Coating

In some variations, the cathode base particles are coated with a layer of LLTO to prevent from chemical and electrochemical reactions of the particle surface with the electrolyte in the battery. The LLTO is a lithium-ion conducting material, such as a Perovskite La$_{2/3-x}$Li$_{3x}$TiO$_3$, which allows the electronic and ionic transfer of lithium through its crystal structure.

In some variations, the Lithium-ion conductivity may be controlled by the ratio of La to Li, which controls the tilt of the TiO$_6$ octahedra and the size of the diffusion pathway for lithium.

In some variations, the molar ratio of lithium (Li) to lanthanum (La) is 0.05 for the LLTO coating. In some variations, the molar ratio of Li to La is 0.1 for the LLTO coating. In some variations, the molar ratio of Li to La is 0.2 for the LLTO coating. In some variations, the molar ratio of Li to La is 0.4 for the LLTO coating. In some variations, the molar ratio of Li to La is 0.6 for the LLTO coating. In some variations, the molar ratio of Li to La is 0.8 for the LLTO coating. In some variations, the molar ratio of Li to La is 1 for the LLTO coating.

In some variations, the molar ratio of Li to Ti is 0.03 for the LLTO coating. In some variations, the molar ratio of Li to Ti is 0.06 for the LLTO coating. In some variations, the molar ratio of Li to Ti is 0.13 for the LLTO coating. In some variations, the molar ratio of Li to Ti is 0.24 for the LLTO coating. In some variations, the molar ratio of Li to Ti is 0.33 for the LLTO coating. In some variations, the molar ratio of Li to Ti is 0.42 for the LLTO coating. In some variations, the molar ratio of Li to Ti is 0.5 for the LLTO coating.

In some variations, the coating includes a blend of the LLTO and an electrically conductive material, such as carbon or LLGO among others.

Although the LLTO is not stable as a solid electrolyte, Applicants surprisingly discovered that LLTO can be used as a coating for a cathode active material or cathode base material. The coated cathode base material results in enhanced battery performance compared to Al$_2$O$_3$ coating. Although LLTO is not stable as a solid electrolyte, the LLTO demonstrates enhanced performance as a protective coating for the cathode base material.

In some variations, 200 ppm or more by weight LLTO is coated over the cathode base material. In some variations, 300 ppm or more by weight LLTO is coated over the cathode base material. In some variations, 400 ppm or more by weight LLTO is coated over the cathode base material. In some variations, 500 ppm or more by weight LLTO is coated over the cathode base material. In some variations, 600 ppm or more by weight LLTO is coated over the cathode base material. In some variations, 700 ppm or more by weight LLTO is coated over the cathode base material. In some variations, 800 ppm or more by weight LLTO is coated over the cathode base material. In some variations, 900 ppm or more by weight LLTO is coated over the cathode base material. In some variations, 1000 ppm or more by weight LLTO is coated over the cathode base material.

In some variations, 2000 ppm or more by weight LLTO is coated over the cathode base material. In some variations, 3000 ppm or more by weight LLTO is coated over the cathode base material. In some variations, 4000 ppm or more by weight LLTO is coated over the cathode base material.

In some variations, less than 1% by weight LLTO is coated over the cathode base material. In some variations, less than 0.5% by weight LLTO is coated over the cathode base material. In some variations, less than 0.1% by weight LLTO is coated over the cathode base material. In some variations, less than 0.01% by weight LLTO is coated over the cathode base material.

LLGO Coating

In some variations, the cathode base particles are coated with a layer of LLGO to prevent from chemical and electrochemical reactions of the particle surface with the electrolyte in the battery. The LLGO is a lithium-ion conducting material, such as a Perovskite $La_{2/3-x}Li_{3x}GeO_3$, which allows the electronic and ionic transfer of lithium through its crystal structure.

In some variations, the lithium-ion conductivity may be controlled by the molar ratio of Li to La. In some variations, the molar ratio of Li to La is 0.05 for the LLGO coating. In some variations, the molar ratio of Li to La is 0.1 for the LLTO coating. In some variations, the molar ratio of Li to La is 0.2 for the LLTO coating. In some variations, the molar ratio of Li to La is 0.4 for the LLTO coating. In some variations, the molar ratio of Li to La is 0.6 for the LLTO coating. In some variations, the molar ratio of Li to La is 0.8 for the LLTO coating. In some variations, the molar ratio of Li to La is 1 for the LLTO coating.

In some variations, the molar ratio of Li to Ge is 0.03 for the LLGO coating. In some variations, the molar ratio of Li to Ge is 0.06 for the LLGO coating. In some variations, the molar ratio of Li to Ge is 0.13 for the LLGO coating. In some variations, the molar ratio of Li to Ge is 0.24 for the LLGO coating. In some variations, the molar ratio of Li to Ge is 0.33 for the LLGO coating. In some variations, the molar ratio of Li to Ge is 0.42 for the LLGO coating. In some variations, the molar ratio of Li to Ge is 0.5 for the LLTO coating.

In some variations, the coating includes a blend of the LLGO and an electrically conductive material, such as carbon, or LLTO among others.

In some variations, 200 ppm or more by weight LLGO is coated over the cathode base material. In some variations, 300 ppm or more by weight LLGO is coated over the cathode base material. In some variations, 400 ppm or more by weight LLGO is coated over the cathode base material. In some variations, 500 ppm or more by weight LLGO is coated over the cathode base material. In some variations, 600 ppm or more by weight LLGO is coated over the cathode base material. In some variations, 700 ppm or more by weight LLGO is coated over the cathode base material. In some variations, 800 ppm or more by weight LLGO is coated over the cathode base material. In some variations, 900 ppm or more by weight LLGO is coated over the cathode base material. In some variations, 1000 ppm or more by weight LLGO is coated over the cathode base material.

In some variations, 2000 ppm or more by weight LLGO is coated over the cathode base material. In some variations, 3000 ppm or more by weight LLGO is coated over the cathode base material. In some variations, 4000 ppm or more by weight LLGO is coated over the cathode base material.

In some variations, less than 1% by weight LLGO is coated over the cathode base material. In some variations, less than 0.5% by weight LLGO is coated over the cathode base material. In some variations, less than 0.1% by weight LLGO is coated over the cathode base material. In some variations, less than 0.01% by weight LLGO is coated over the cathode base material.

The cathode active material for lithium-ion batteries can be in a form of powder, as described above. These cathode active materials assist energy storage by releasing and storing lithium-ions during, respectively, charging and discharging of a lithium-ion battery.

Without wishing to be limited to a specific mechanism or mode of action, the coated powder can provide improved battery performance when the coated powder is used as a cathode active material. The coated powder comprising the disclosed LLTO or LLGO conducting coating described herein provide sharper knee in the potential versus capacity curve than a conventional $Al_2O_3$ coating. Batteries comprising the LLTO or LLGO coated powder as a cathode active material have increased average voltage and energy retention.

Cathode Active Compounds

The coating is disposed over cathode active compounds. Specifically, in various aspects, the coating is disposed over cathode active compound particles. The coated cathode active compounds can be used as cathode active materials in lithium-ion batteries.

In some variations, this disclosure is directed to a cathode active precursor compound, or particles (e.g., a powder) comprising the cathode active precursor compound, represented by Formula (Ia):

$$Ni_aMn_bCo_cM^1_dO_e \qquad (Ia)$$

In Formula (Ia), $M^1$ is selected from B, Na, Mg, Al, Si, K, Ca, Sc, Ti, V, Cr, Fe, Cu, Zn, Ga, Ge, Zr, Nb, Mo, Ru, Ag, In, La and any combination thereof; $0 \le a \le 1$; $0 \le b \le 1$; $0 \le c \le 1$; $a+b+c>0$; $0 \le d \le 0.5$; $a+b+d>0$; and $1 \le e \le 5$. Compounds of Formula (Ia) include at least one of Ni, Mn, or Co (i.e., $a+b+c>0$). Moreover, the compounds include at least one of Ni, Mn, or $M^1$ (i.e., $a+b+d>0$).

In some variations, this disclosure is directed to a cathode active compound, or particles (e.g., a powder) comprising the cathode active compound, represented by Formula (Ib):

$$Li_{1+f}Ni_aMn_bCo_cM^1_dO_e \qquad (Ib)$$

It will be appreciated that the lithiated mixed-metal oxides may be prepared using the mixed-metal oxides associated with Formula (Ia), as will be discussed below. In Formula (Ib), $M^1$ is selected from B, Na, Mg, Al, Si, K, Ca, Sc, Ti, V, Cr, Fe, Cu, Zn, Ga, Ge, Zr, Nb, Mo, Ru, Ag, In, La and combinations thereof; $-0.1 \le f \le 1.0$; $0 \le a \le 1$; $0 \le b \le 1$; $0 \le c \le 1$; $a+b+c>0$; $0 \le d \le 0.5$; $a+b+d>0$; and $1.9 \le e \le 3$. Compounds of Formula (Ib) include at least one of Ni, Mn, or Co (i.e., $a+b+c>0$). Moreover, the compounds include at least one of Ni, Mn, or $M^1$ (i.e., $a+b+d>0$). As used herein, all compounds referenced for the lithiated mixed-metal oxides represent those of as-prepared materials (i.e., "virgin" materials) unless otherwise indicated. Such compounds have not yet been exposed to additional chemical processes, such as de-lithiation and lithiation during, respectively, charging and discharging. In some instances, $0 \le f \le 0.5$. In some instances, $1.9 \le e \le 2.7$. In further instances, $1.9 \le e \le 2.1$.

In some instances, $0 \le f \le 1.0$ and $d=0$. In these instances, no content associated with $M^1$ is present in the particles. Further, in some instances, $d=0$ and $f \ge 0.20$. In some instances, $d=0$ and $f \ge 0.40$. In some instances, $d=0$ and $f \ge 0.60$. In some instances, $d=0$ and $f \ge 0.80$. In some instances, $d=0$ and $f \le 0.60$. In some instances, $d=0$ and $f \le 0.40$. In some instances, $d=0$ and $f \le 0.20$. In some instances, $d=0$ and $e \ge 2.20$. In some instances, d=0 and e≥2.40. In some instances, d=0 and e≥2.60. In some instances, d=0 and e≥2.80. In some instances, d=0 and e≤2.80. In some instances, d=0 and e≤2.60. In some instances, d=0 and e≤2.40. In some instances, d=0 and e≤2.20. It will be understood that, in the aforementioned instances, the boundaries of f and e can be combined in any variation as above.

In some instances, $M^1$ can include one or more cations with an average oxidation state of 4+, i.e., $M^1_1$. $M^1$ also can include more than one cation with a combined oxidation state of 3+, i.e., $M^1_1 M^1_2$. $M^1_1$ is selected from Ti, Mn, Zr, Mo, and Ru and may be any combination thereof. $M^1_2$ is selected from Mg, Ca, V, Cr, Fe, Cu, Zn, Al, Sc, Y, Ga, and Zr and may be any combination thereof. A stoichiometric content associated with $MM^1_1$, i.e., $d_1$, and a stoichiometric content associated with $M^1_2$, i.e., $d_2$, equals d (i.e., $d_1+d_2=d$). In these instances, $a+b+c+d_1+d_2=1$. Further, in some instances, $d_1 \geq 0.1$. In some instances, $d_1 \geq 0.2$. In some instances, $d_1 \geq 0.3$. In some instances, $d_1 \geq 0.4$. In some instances, $d_1 \leq 0.1$. In some instances, $d_1 \leq 0.2$. In some instances, $d_1 \leq 0.3$. In some instances, $d_1 \leq 0.4$. It will be understood that, in the aforementioned instances, the boundaries of $d_1$ can be combined in any variation as above.

In some instances, $-0.05 \leq f \leq 0.10$; $M^1$=Al; $0 \leq d \leq 0.05$; $a+b+c=1$; $0<a+b<0.5$; and $1.95 \leq e \leq 2.6$. In further instances, $0.01 \leq d \leq 0.03$. In still further instances, $0.02 \leq d \leq 0.03$. In instances where d #0 (i.e., aluminum is present), a distribution of aluminum within each particle may be uniform or may be biased to be proximate to a surface of each particle. Other distributions are possible.

In some instances, $-0.05 \leq f \leq 0.10$; d=0; a=0, b+c=1; and $1.9 \leq e \leq 2.2$. Further, in some instances, $0.0 \leq f \leq 0.10$. In some instances, $0.0 \leq f \leq 0.05$. In some instances, $0.01 \leq f \leq 0.05$ and $0.02 \leq b \leq 0.05$. In some instances, $0.01 \leq f \leq 0.05$ and b=0.04.

In some variations, this disclosure is directed to a cathode active precursor compound, or particles (e.g., a powder) comprising the cathode active precursor compound, represented by Formula (IIa):

$$M^2 O_g \qquad \text{(IIa)}$$

wherein $M^2$=Co, Mn, Ni, and any combination thereof; and $0.9 \leq g \leq 2.6$. In some variations, $0.9 \leq g \leq 1.1$. In some variations, g=1. In some variations, $1.4 \leq g \leq 1.6$. In some variations, g=1.5. In some variations, $1.9 \leq g \leq 2.1$. In some variations, g=2. In some variations, $2.4 \leq g \leq 2.6$. In some variations, g=2.5.

In some variations, this disclosure is directed to a cathode active compound, or particles (e.g., a powder) comprising the cathode active compound, represented by Formula (IIb):

$$Li_h M^2 O_g \qquad \text{(IIb)}$$

wherein $M^2$=Co, Mn, Ni, and any combination thereof, $0.95 \leq h \leq 2$, and $2 \leq g \leq 3$. In some variations, $1 \leq h \leq 2$. In some variations, $1.20 \leq h$. In some variations, $1.40 \leq h$. In some variations, $1.60 \leq h$. In some variations, $1.80 \leq h$. In some variations, $h \leq 1.8$. In some variations, $h \leq 1.6$. In some variations, $h \leq 1.4$. In some variations, $h \leq 1.2$. In some variations, $h \leq 1.8$. Further, in some variations, $2.2<g$. In some variations, $2.4<g$. In some variations, $2.6 \leq g$. In some variations, $2.8 \leq g$. In some variations, $g \leq 2.8$. In some variations, $g \leq 2.6$. In some variations, $g \leq 2.4$. In some variations, $g \leq 2.2$. It will be understood that the boundaries of h and g can be combined in any variation as above.

In some variations, this disclosure is directed to a cathode active precursor compound, or particles (e.g., a powder) comprising the cathode active precursor compound, represented by Formula (IIIa):

$$M^3_i M^4_{1-i} O_j \qquad \text{(IIIa)}$$

wherein $M^3$ is selected from Ti, Mn, Zr, Mo, Ru, and any combination thereof; $M^4$ is selected from B, Na, Mg, Ti, Ca, V, Cr, Mn, Fe, Co, Ni, Cu, Zn, Al, Sc, Y, Ga, Zr, Ru, Mo, and any combination thereof; $0 \leq i \leq 1$; and $0.9 \leq j \leq 2.6$. In some variations, $M^3$ has an average oxidation state of 4+ (i.e., tetravalent). In some variations, $M^4$ has an average oxidation state of 3+ (i.e., trivalent). In some variations, $0 \leq i \leq 1$. In specific variations, $M^3$ is Mn. In specific variations, $M^4$ is Co. In specific variations, $M^4$ is a combination of Co and Mn. In further variations, a proportion of Co is greater than a proportion of Mn in the combination of Co and Mn.

In some variations, $1.4 \leq j \leq 2.1$. In some variations, $1.5 \leq j \leq 2.0$. In some variations, $1.6 \leq j \leq 1.9$. In some variations, $0.9 \leq j \leq 1.1$. In some variations, j=1. In some variations, $1.4 \leq j \leq 1.6$. In some variations, j=1.5. In some variations, $1.9 \leq j \leq 2.1$. In some variations, j=2. In some variations, $2.4 \leq j \leq 2.6$. In some variations, j=2.5.

In some variations, this disclosure is directed to a cathode active compound, or particles (e.g., a powder) comprising the cathode active compound, represented by Formula (IIIb):

$$(i)[Li_2 M^3 O_3] \cdot (1-i)[Li M^4 O_2] \qquad \text{(IIIb)}$$

wherein $M^3$ is one or more cations with an average oxidation state of 4+ (i.e., tetravalent), $M^4$ is one or more cations with an average oxidation state of 3+ (i.e., trivalent), and $0 \leq i \leq 1$. In some variations, $M^3$ is selected from Ti, Mn, Zr. Mo, Ru, and a combination thereof. In specific variations, $M^3$ is Mn. In some variations, $M^4$ is selected from B, Na, Mg, Ti, Ca, V, Cr, Mn, Fe, Co, Ni, Cu, Zn, Al, Sc, Y, Ga, Zr, Ru, Mo and a combination thereof. In specific variations, $M^4$ is Co. In specific variations, $M^4$ is a combination of Co and Mn. In further variations, a proportion of Co is greater than a proportion of Mn in the combination of Co and Mn. In variations where $M^4$ includes cobalt, cobalt may be a predominant transition-metal constituent.

In some variations, this disclosure is directed to a cathode active compound, or particles (e.g., a powder) comprising the cathode active compound, represented by Formula (IIIc):

$$(i)[Li_2 M^3 O_3] \cdot (1-i)[Li_{1-k} M^4 O_2] \qquad \text{(IIIc)}$$

wherein $M^3$ is one or more cations with an average oxidation state of 4+ (i.e., tetravalent), $M^4$ is one or more cations, $0 \leq i \leq 1$, and $0 \leq k \leq 1$. In some variations, $M^3$ is selected from Ti, Mn, Zr, Mo, Ru, and a combination thereof. In specific variations, $M^1$ is Mn. In some variations, $M^4$ is selected from B, Na, Mg, Ti, Ca, V, Cr, Mn, Fe, Co, Ni, Cu, Zn, Al, Sc, Y, Ga, Zr, Ru, Mo, and any combination thereof. In specific variations, $M^4$ is Co. In specific variations, $M^4$ is a combination of Co and Mn. In further variations, a proportion of Co is greater than a proportion of Mn in the combination of Co and Mn. In variations where $M^4$ includes cobalt, cobalt may be a predominant transition-metal constituent which allows high voltage, and high volumetric energy density for cathode active materials employed in lithium-ion batteries.

In some variations, $0 \leq k \leq 0.16$. In some variations, $0 \leq k \leq 0.14$. In some variations, $0 \leq k \leq 0.12$. In some variations, $0 \leq k \leq 0.10$. In some variations, $0 \leq k \leq 0.08$. In some variations, $0 \leq k \leq 0.06$. In some variations, $0 \leq k \leq 0.04$. In some variations, $0 \leq k \leq 0.02$. In some variations, k=0.15. In some variations, k=0.14. In some variations, k=0.13. In some variations, k=0.12. In some variations, k=0.11. In some variations, k=0.10. In some variations, k=0.09. In some variations, k=0.08. In some variations, k=0.07. In some variations, k=0.06. In some variations, k=0.05. In some variations, k=0.04. In some variations, k=0.03. In some variations, k=0.02. In some variations, k=0.01.

In some variations, this disclosure is directed to a cathode active precursor compound, or particles (e.g., a powder) comprising the cathode active precursor compound, represented by Formula (IVa):

$$Co_{1-l}M^5_lAl_mO_n \qquad (IVa)$$

wherein $M^5$ is B, Na, Mn, Ni, Mg, Ti, Ca, V, Cr, Fe, Cu, Zn, Al, Sc, Y, Ga, Zr, Mo, Ru, and any combination thereof; $0<l<0.50$; $0 \leq m \leq 0.05$; and $0.9 \leq n \leq 2.6$. In some variations, $M^5$ is Mn, Ni, and any combination thereof.

In some variations, $1.4 \leq n \leq 2.1$. In some variations, $1.5 \leq n \leq 2.0$. In some variations, $1.6 \leq n \leq 1.9$. In some variations, $0.9 \leq n \leq 1.1$. In some variations, $n=1$. In some variations, $1.4 \leq n \leq 1.6$. In some variations, $n=1.5$. In some variations, $1.9 \leq n \leq 2.1$. In some variations, $n=2$. In some variations, $2.4 \leq n \leq 2.6$. In some variations, $n=2.5$.

In some variations, $0.01 \leq m \leq 0.03$. In some variations, $0.001 \leq m \leq 0.005$. In some variations, $0.002 \leq m \leq 0.004$. In some variations, $m=0.003$. In some variations, $0.02 \leq m \leq 0.03$. In variations of Formula (IVa) where $m \neq 0$ (i.e., aluminum is present), a distribution of aluminum within the particle may be uniform or may be biased to be proximate to a surface of the particle. Other distributions of aluminum are possible. In some variations, Al is at least 500 ppm. In some variations, Al is at least 750 ppm. In some variations, Al is at least 900 ppm. In some variations, Al is less than or equal to 2000 ppm. In some variations, Al is less than or equal to 1500 ppm. In some variations, Al is less than or equal to 1250 ppm. In some variations, Al is approximately 1000 ppm. In an optional alternative, the compound can be expressed as $Co_{1-l}M^5_lO_n$ and Al expressed in ppm.

In some variations, $0.9 \leq n \leq 1.1$. In some variations, $n=1$. In some variations, $1.4 \leq n \leq 1.6$. In some variations, $n=1.5$. In some variations, $1.9 \leq n \leq 2.1$. In some variations, $n=2$. In some variations, $2.4 \leq n \leq 2.6$. In some variations, $n=2.5$. In some variations, $1.4 \leq n \leq 2.1$. In some variations, $1.5 \leq n \leq 2.0$. In some variations, $1.6 \leq n \leq 1.9$.

In some variations, this disclosure is directed to a cathode active compound, or particles (e.g., a powder) comprising the cathode active compound, represented by Formula (IVb):

$$Li_oCo_{1-l}M^5_lAl_mO_n \qquad (IVb)$$

wherein $M^5$ is B, Na, Mn, Ni, Mg, Ti, Ca, V, Cr, Fe, Cu, Zn, Al, Sc, Y, Ga, Zr, Mo, Ru, and any combination thereof; $0.95 \leq o \leq 1.10$; $0<l<0.50$; $0 \leq m \leq 0.05$; and $1.95 \leq n \leq 2.60$. In some variations, $M^5$ is Mn, Ni, and any combination thereof.

In some variations, $0.01 \leq m \leq 0.03$. In some variations, $0.001 \leq m \leq 0.005$. In some variations, $0.002 \leq m \leq 0.004$. In some variations, $m=0.003$. In some variations, $0.02 \leq m \leq 0.03$. In variations of Formula (IVb) where $m \neq 0$ (i.e., aluminum is present), a distribution of aluminum within the particle may be uniform or may be biased to be proximate to a surface of the particle. Other distributions of aluminum are possible. In some variations, Al is at least 500 ppm. In some variations, Al is at least 750 ppm. In some variations, Al is at least 900 ppm. In some variations, Al is less than or equal to 2000 ppm. In some variations, Al is less than or equal to 1500 ppm. In some variations, Al is less than or equal to 1250 ppm. In some variations, Al is approximately 1000 ppm. In additional variations of Formula (IVb), $1.02 \leq o \leq 1.05$ and $0.02 \leq l \leq 0.05$. In further variations of Formula (4b), $1.03 \leq o \leq 1.05$ and $l=0.04$. It will be recognized that the components as described above can be in any combination. In some instances, when Al is expressed in ppm, in one aspect, the compound can be represented as $Li_oCo_{1-l}M^5_lO_n$ and the amount of Al can be represented as Al in at least a quantity in ppm, as described herein.

The various compounds of Formulae (IIb), (IIIb), (IIIc), and (IVb) can include $Mn^{4+}$. Without wishing to be limited to any theory or mode of action, incorporating $Mn^{4+}$ can improve a stability of oxide under high voltage charging (e.g., 4.5V) and can also help maintain an $R\bar{3}m$ crystal structure (i.e., the $\alpha$-NaFeO$_2$ structure) when transitioning through a 4.1-4.3V region (i.e., during charging and discharging).

In some variations, this disclosure is directed to a cathode active precursor compound, or particles (e.g., a powder) comprising the cathode active precursor compound, represented by Formula (Va):

$$Co_{1-p}Mn_pM^6_qO_r \qquad (Va)$$

wherein $M^6$ is at least one element selected from the group consisting of B, Na, Mg, Ti, Ca, V, Cr, Fe, Co, Ni, Cu, Zn, Al, Sc, Y, Ga, Zr, Ru, and Mo; $0<p \leq 0.30$; $0 \leq q \leq 0.10$; and $0.9 \leq r \leq 2.6$. In some variations, $q=0$. In some variations, $M^6$ is Al.

In some variations, $1.4 \leq r \leq 2.1$. In some variations, $1.5 \leq r \leq 2.0$. In some variations, $1.6 \leq r \leq 1.9$. In some variations, $0.9 \leq r \leq 1.1$. In some variations, $r=1$. In some variations, $1.4 \leq r \leq 1.6$. In some variations, $r=1.5$. In some variations, $1.9 \leq r \leq 2.1$. In some variations, $n=r$. In some variations, $2.4 \leq r \leq 2.6$. In some variations, $r=2.5$.

In some variations, this disclosure is directed to a cathode active compound, or particles (e.g., a powder) comprising the cathode active compound, represented by Formula (Vb):

$$Li_sCo_{1-p}Mn_pO_r \qquad (Vb)$$

wherein $0.95 \leq s \leq 1.10$, $0 \leq p \leq 0.10$, and $1.90 \leq r \leq 2.20$. In some variations, $0 \leq p \leq 0.10$. In some variations, $0.98 \leq s \leq 1.01$. In some variations of Formula (Vb), $0.98 \leq s \leq 1.01$ and $p=0.03$. In some variations of Formula (Vb), $1.00 \leq s \leq 1.05$. In some variations, the disclosure is directed to a compound represented by Formula (Vb), wherein $0.95 \leq s \leq 1.05$ and $0.02 \leq p \leq 0.05$. In a further aspect, the disclosure is directed to a compound represented by Formula (Vb), wherein $0.95 \leq s \leq 1.05$ and $p=0.04$. In some variations, $p=0.03$. In further variations of Formula (Vb), $1.01 \leq s \leq 1.05$ and $0.02 \leq p \leq 0.05$. In still further variations of Formula (Vb), $1.01 \leq s \leq 1.05$ and $p=0.04$. In some variations of Formula (Vb), $1.00 \leq s \leq 1.10$. In other variations of Formula (Vb), $1.00 \leq s \leq 1.05$. In a further aspect, the disclosure is directed to a compound represented by Formula (Vb), wherein $0.98 \leq s \leq 1.01$, $p=0.03$, and $r=2$.

It will be appreciated that s represents a molar ratio of lithium content to total transition-metal content (i.e., total content of Co and Mn). In various aspects, increasing lithium content can increase capacity, improve stability, increase gravimetric density of particles comprising the compound, increase particle density, and/or increase particle strength of the cathode active material. In various aspects, decreasing lithium content can increase capacity, improve stability, increase gravimetric density of particles comprising the compound, increase particle density, and/or increase particle strength of the cathode active material.

In some variations, the compound of Formula (Vb) may be represented as a solid solution of two phases, i.e., a solid solution of Li$_2$MnO$_3$ and LiCoO$_2$. In these variations, the compound may be described according to Formula (Vc):

$$(p)[Li_2MnO_3] \cdot (1-p)[LiCoO_2] \qquad (Vc)$$

where Mn is a cation with an average oxidation state of 4+ (i.e., tetravalent) and Co is a cation with an average oxidation state of 3+(i.e., trivalent). A more compact notation for Formula (Vc) is given below:

$$Li_{1+p}Co_{1-p}Mn_pO_{2+p} \quad (Vd)$$

In Formula (Vd), p can describe both Mn and Co. Due to differing valences between Mn and Co, the inclusion of Mn may influence a lithium content and an oxygen content of the compound.

Referring back to Formula (Vb), 'p' can be $0 \le p \le 0.10$. In such variations, the lithium content can be from 1 to 1.10 (i.e., 1+p), and the oxygen content can be from 2 to 2.10 (i.e., 2+p). However, the compounds disclosed herein have lithium contents and oxygen contents that may vary independently of p. For example, and without limitation, the lithium and oxygen contents may vary from stoichiometric values due to synthesis conditions deliberately selected by those skilled in the art. As such, subscripts in Formulas (Vc) and (Vd) are not intended as limiting on Formula (Vb), i.e., s is not necessarily equal to 1+p, and r is not necessarily equal 2+p. It will be appreciated that one or both of the lithium content and the oxygen content of compounds represented by Formula (Vb) can be under-stoichiometric (i.e., s<1+p; r<2+p) or over-stoichiometric (i.e., s>1+l; r>2+p) relative to the stoichiometric values of Formula (Vd).

In some variations, the compound of Formula (Vb) may be represented as a solid solution of two phases, i.e., a solid solution of $Li_2MnO_3$ and $LiCoO_2$. In these variations, the compound may be described according to Formula (Ve):

$$(t)[Li_2MnO_3] \cdot (1-t)[Li_{(1-u)}Co_{(1-u)}Mn_uO_2] \quad (Ve)$$

where Mn is a cation with an average oxidation state of 4+ (i.e., tetravalent) and Co is a cation with an average oxidation state of 3+(i.e., trivalent). A unified notation for Formula (Ve) is given below:

$$Li_{1+t-u-tu}Co_{(1-t)(1-u)}Mn_{(t+u-tu)}O_{2+t} \quad (Vf)$$

In Formula (Vf), t and u can describe both Mn and Co. Without wishing to be held to a particular mechanism or mode of action, because of differing valences between Mn and Co, inclusion of Mn may influence lithium content and oxygen content of the compound.

Comparing Formulas (Vb) and (Vf) shows s=1+t-u-tu, p=t+u-tu, r=2+t. In compounds represented by Formula V(f), the lithium content can be any range described herein for Formula (Vb). In some variations, Li can be from 0.95 to 1.10. In some variations, oxygen content can be from 2 to 2.20.

In other variations, this disclosure is directed to a compound, or particles (e.g., a powder) comprising a compound, represented by Formula (Vg):

$$Li_sCo_{1-p-q}Mn_pM^6_qO_r \quad (Vg)$$

wherein $0.95 \le s \le 1.30$, $0 \le p \le 0.30$, $0 \le q \le 0.10$, and $1.98 \le r \le 2.04$, and $M^6$ is at least one element selected from the group consisting of B, Na, Mg, Ti, Ca, V, Cr, Fe, Co, Ni, Cu, Zn, Al, Sc, Y, Ga, Zr, Ru, and Mo. The compound of Formula (Vg) is single phase. The compound can have a trigonal $R\bar{3}m$ crystal structure. In further variations, $0.98 \le s \le 1.16$ and $0 < p \le 0.16$. In some variations $0.98 \le s \le 1.16$, $0 \le p \le 0.16$, and $0 \le q \le 0.05$.

In other variations, this disclosure is directed to a compound, or particles (e.g., a powder) comprising a compound, represented by Formula (Vh):

$$Li_sCo_{1-p-q}Mn_pAl_qO_r \quad (Vh)$$

wherein $0.95 \le s \le 1.30$, $0 \le p \le 0.30$, $0 \le q \le 0.10$, and $1.98 \le r \le 2.04$. In some variations, $0.96 \le s \le 1.04$, $0 < p \le 0.10$, $0 \le q \le 0.10$, and $1.98 \le r \le 2.04$. In some variations, the compounds represented by Formula (Vh) have $0.98 \le s \le 1.01$, $0.02 \le p \le 0.04$, and $0 \le q \le 0.03$. The compound of Formula (Vh) is a single phase. The compound can have trigonal $R\bar{3}m$ crystal structure.

In some variations, this disclosure is directed to a cathode active precursor compound, or particles (e.g., a powder) comprising the cathode active precursor compound, represented by Formula (VIa):

$$(v)[M^7O_2] \cdot (1-v)[Co_{1-\sigma}M^8_\sigma O_2] \quad (VIa)$$

wherein $M^7$ is one or more elements with an average oxidation state of 4+ (i.e., tetravalent); $M^8$ is one or more monovalent, divalent, trivalent, and tetravalent elements; $0.01 \le v < 1.00$, and $0 \le \sigma \le 0.05$. In some variations, $M^7$ is selected from Mn, Ti, Zr, Ru, and a combination thereof. In some variations, $M^8$ is selected from B, Na, Mg, Ti, Ca, V, Cr, Mn, Fe, Co, Ni, Cu, Zn, Al, Sc, Y, Ga, Zr, Ru, Mo and a combination thereof. In some variations, $M^7$ is Mn. In some variations, $M^8$ is Al.

In some embodiments, $0.01 \le v \le 0.50$. In some embodiments, $0.01 \le v \le 0.50$. In some embodiments, $0.01 \le v \le 0.30$. In some embodiments, $0.01 \le v \le 0.10$. In some embodiments, $0.01 \le v \le 0.05$. In some variations, $0 \le \sigma \le 0.05$. In some variations, $0 \le \sigma \le 0.03$. In some variations, $0 \le \sigma \le 0.02$. In some variations, $0 \le \sigma \le 0.01$. In some variations, $0.01 \le v < 0.05$, and $0 < \sigma \le 0.05$.

In some variations, Al is at least 500 ppm. In some variations, Al is at least 750 ppm. In some variations, Al is at least 900 ppm. In some variations, Al is less than or equal to 2000 ppm. In some variations, Al is less than or equal to 1500 ppm. In some variations, Al is less than or equal to 1250 ppm. In some variations, Al is less than or equal to 1000 ppm. In some variations, Al is less than or equal to 900 ppm. In some variations, Al is less than or equal to 800 ppm. In some variations, Al is less than or equal to 700 ppm. In some variations, Al is less than or equal to 600 ppm. In some instances, when $M^8$ (e.g., Al) is expressed in ppm, in optional variations, the compound can be represented as $(v)[[Li_2M^7O_3] (1-v)[Li_\alpha Co_w O_2]$ and the amount of $M^8$ can be represented as $M^8$ in at least a quantity in ppm, as otherwise described above. In some embodiments, $0.5 \le w \le 1$. In some embodiments, $0.8 \le w \le 1$. In some embodiments, $0.96 \le w \le 1$. In some embodiments, $0.99 \le w \le 1$. In some embodiments, w is 1.

In some variations, this disclosure is directed to a cathode active compound, or particles (e.g., a powder) comprising the cathode active compound, represented by (VIb):

$$(v)[Li_2M^7O_3] \cdot (1-v)[Li_\alpha Co_{1-\sigma}M^8_\sigma O_2] \quad (VIb)$$

wherein $M^7$ is one or more elements with an average oxidation state of 4+ (i.e., tetravalent); $M^8$ is one or more monovalent, divalent, trivalent, and tetravalent elements; $0.95 \le \alpha \le 1.05$; $0.01 \le v < 1.00$, and $0.5 \le w \le 1$, and $0 \le \sigma \le 0.05$. In some variations, $0.95 \le \alpha < 0.99$. In some variations, $M^7$ is selected from Mn, Ti, Zr, Ru, and a combination thereof. In some variations, $M^8$ is selected from B, Na, Mg, Ti, Ca, V, Cr, Mn, Fe, Co, Ni, Cu, Zn, Al, Sc, Y, Ga, Zr, Ru, Mo and a combination thereof. In some variations, $M^7$ is Mn. In some variations, $M^8$ is Al.

In some embodiments, $0.01 \le v \le 0.50$. In some embodiments, $0.01 \le v \le 0.50$. In some embodiments, $0.01 \le v \le 0.30$. In some embodiments, $0.01 \le v \le 0.10$. In some embodiments, $0.01 \le v \le 0.05$. In some variations, $0 \le \sigma \le 0.05$. In some variations, $0 < \sigma \le 0.03$. In some variations, $0 \le \sigma \le 0.02$. In some variations, $0 \le \sigma \le 0.01$. In some variations, $0.95 \le \alpha \le 1.05$, $0.01 \le v < 0.05$, $0.96 \le w < 1$, and $0 < \sigma \le 0.05$. In some variations, $0.95 \le \alpha < 0.99$.

In some variations, $M^8$ (e.g., Al) is at least 500 ppm. In some variations, $M^8$ (e.g., Al) is at least 750 ppm. In some variations, $M^8$ (e.g., Al) is at least 900 ppm. In some variations, $M^8$ (e.g., Al) is less than or equal to 2000 ppm. In some variations, $M^8$ (e.g., Al) is less than or equal to 1500 ppm. In some variations, $M^8$ (e.g., Al) is less than or equal to 1250 ppm. In some variations, $M^8$ (e.g., Al) is less than or equal to 1000 ppm. In some variations, $M^8$ (e.g., Al) is less than or equal to 900 ppm. In some variations, $M^8$ (e.g., Al) is less than or equal to 800 ppm. In some variations, M, (e.g., Al) is less than or equal to 700 ppm. In some variations, $M^8$ (e.g., Al) is less than or equal to 600 ppm. In some instances, when $M^8$ (e.g., Al) is expressed in ppm, the compound can be represented as $(v)[Li_2M^7O_3]\cdot(1-v)[Li_\alpha Co_w O_2]$ and the amount of $M^8$ can be represented as $M^8$ in at least a quantity in ppm, as otherwise described above. In some variations, $0.5 \leq w \leq 1$. In some variations, $0.8 \leq w \leq 1$. In some variations, $0.96 \leq w \leq 1$. In some variations, $0.99 \leq w \leq 1$. In some variations, w is 1.

In some variations, the disclosure is directed to a cathode active material for lithium ion batteries that includes a lithium nickel oxide ($LiNiO_2$) having one or more tetravalent metals selected from Mn, Ti, Zr, Ge, Sn, and Te and/or one or more divalent metals selected from Mg, Be, Ca, Sr, Ba, Fe, Ni, Cu, and Zn. In these materials, the trivalent Ni ion can serve as host to supply the capacity. Without wishing to be limited to any theory or mode of action, a tetravalent ion such as $Mn^{4+}$, and a divalent ion such as $Mg^{2+}$, can stabilize the structure and help Ni ion stay trivalent for typical layer $LiNiO_2$ oxide.

The lithium nickel oxide may also include a stabilizer component, $Li_2MeO_3$, in which Me is one or more elements selected from Mn, Ti, Ru, and Zr. Without wishing to be limited to any theory or mode of action, $Li_2MeO_3$ can stabilize a layered crystal structure and improve a reversible capability of the lithium nickel oxide in a voltage window of a lithium-ion cell. Representative examples of Me include Mn, Ti, Ru, Zr, and any combination thereof.

In some variations, this disclosure is directed to a cathode active precursor compound, or particles (e.g., a powder) comprising the cathode active precursor compound, represented by Formula (VIIa):

$$Ni_xM^9_yM^{10}_zO_a \quad \text{(VIIa)}$$

where $M^9$ is selected from Mn, Ti, Zr, Ge, Sn, Te, and any combination thereof; $M^{10}$ is selected from Mg, Be, Ca, Sr, Ba, Fe, Ni, Cu, Zn, and any combination thereof; $0.7<x<1$; $0 \leq y \leq 0.3$; $0<z<0.3$; $x+y+z=1$; and $0.9 \leq \alpha \leq 2.6$. In some variations of Formula (VIIa), $M^9$ is Mn and $M^{10}$ is Mg. In some variations of Formula (VIIa), $0.05 \leq y \leq 0.3$ and $0.05<z<0.3$.

In some variations, $1.4 \leq \alpha \leq 2.1$. In some variations, $1.5 \leq \alpha \leq 2.0$. In some variations, $1.6 \leq \alpha \leq 1.9$. In some variations, $0.9 \leq \alpha \leq 1.1$. In some variations, $\alpha=1$. In some variations, $1.4 \leq \alpha \leq 1.6$. In some variations, $\alpha=1.5$. In some variations, $1.9 \leq \alpha \leq 2.1$. In some variations, $\alpha=2$. In some variations, $2.4 \leq \alpha \leq 2.6$. In some variations, $\alpha=2.5$.

In some variations, this disclosure is directed to a cathode active compound, or particles (e.g., a powder) comprising the cathode active compound, represented by Formula (VIIb):

$$Li_\beta Ni_xM^9_yM^{10}_zO_2 \quad \text{(VIIb)}$$

where $M^9$ is selected from Mn, Ti, Zr, Ge, Sn, Te, and a combination thereof; $M^{10}$ is selected from Mg, Be, Ca, Sr, Ba, Fe, Ni, Cu, Zn, and a combination thereof; $0.9<\beta<1.1$; $0.7<x<1$; $0 \leq y \leq 0.3$; $0<z<0.3$; and $x+y+z=1$. In some variations of Formula (VIIb), $0.05 \leq y \leq 0.3$ and $0.05<z<0.3$.

In some variations, this disclosure is directed to a cathode active compound, or particles (e.g., a powder) comprising the cathode active compound, represented by Formula (VIIc):

$$Li_\beta Ni_x Mn_y Mg_z O_2 \quad \text{(VIIc)}$$

where $0.9<\beta<1.1$; $0.7<x<1$; $0 \leq y \leq 0.3$; $0<z<0.3$; and $x+y+z=1$. In some variations of Formula (VIIc), $0.05 \leq y \leq 0.3$ and $0.05<z<0.3$.

In compounds of Formula (VIIc), a valence of Mg remains 2+ and a valence of Mn remains 4+. Again, without wishing to be held to a particular theory or mode of action, the valence of Mg remains 2+ to stabilize a layered crystal structure and improve electrochemical performance of the cathode active materials represented by Formula (VIIc). As compared to known cathode formulae, the amount of $Ni^{2+}$ can be reduced to achieve charge balance. Unlike $Ni^{2+}$, which can transition electronically to $Ni^{3+}$, $Mg^{2+}$ represents a stable divalent ion in the cathode active material. Thus, in order to maintain an average transition-metal valence of 3+, a presence of $Mg^{2+}$ in the cathode active material biases Ni away from $Ni^{2+}$ to $Ni^{3+}$. Such bias towards $Ni^{3+}$ decreases the availability of $Ni^{2+}$ to occupy a $Li^+$ site, which decreases performance of the cathode active material.

In some variations, Ni is an active transition metal at a higher stoichiometric amount than in conventional materials. In further variations, the active transition metal of Ni is trivalent in the material (i.e., 3+). During an electrochemical charge/discharge process in a cell, the redox couple between $Ni^{3+}/Ni^{4+}$ influences a capacity of the cell.

The compounds of Formulae (VIIb) and (VIIc) as disclosed herein have properties that are surprisingly improved over properties of known compositions.

In some variations, this disclosure is directed to a cathode active precursor compound, or particles (e.g., a powder) comprising the cathode active precursor compound, represented by Formula (VIIIa):

$$M^{11}_\gamma Ni_{(1-\gamma)\delta}M^{12}_{(1-\gamma)\delta}M^{13}_{(1-\gamma)\delta}O_\eta \quad \text{(VIIIa)}$$

where $M^{11}$ is selected from Mn, Ti, Ru, Zr, and any combination thereof; $M^{12}$ is selected from Mn, Ti, Zr, Ge, Sn, Te, and any combination thereof; $M^{13}$ is selected from Mg, Be, Ca, Sr, Ba, Fe, Ni, Cu, Zn, and any combination thereof; $0 \leq \gamma \leq 0.3$; $0.7<\delta<1$; $0<\epsilon<0.3$; $0<\zeta<0.3$; $\delta+\epsilon+\zeta=1$; and $0.9 \leq \eta \leq 2.6$.

In some variations of Formula (VIIIa), $0.05<\epsilon<0.3$ and $0.05<\zeta<0.3$. In some variations, $1.4 \leq \eta \leq 2.1$. In some variations, $1.5 \leq \eta \leq 2.0$. In some variations, $1.6 \leq \eta \leq 1.9$. In some variations, $0.9 \leq \eta \leq 1.1$. In some variations, $\eta=1$. In some variations, $1.4 \leq \eta \leq 1.6$. In some variations, $\eta=1.5$. In some variations, $1.9 \leq \eta \leq 2.1$. In some variations, $\eta=2$. In some variations, $2.4 \leq \eta \leq 2.6$. In some variations, $\eta=2.5$.

In some variations, this disclosure is directed to a cathode active compound, or particles (e.g., a powder) comprising the cathode active compound, represented by Formula (VIIIb):

$$\gamma Li_2M^{11}O_3 \cdot (1-\gamma)Li_\theta Ni_\delta M^{12}_\epsilon M^{13}_\zeta O_2 \quad \text{(VIIIb)}$$

In Formula (VIIIb), $Li_\theta Ni_\delta M^{12}_\epsilon M^{13}_\zeta O_2$ serves as the active component and $Li_2M^{11}O_3$ serves as the stabilizer component. The compound of Formula (VIIIb) corresponds to integrated or composite oxide material. A ratio of the components is governed by $\gamma$, which ranges according to $0 \leq y \leq 0.3$. For the $Li_2M^{11}O_3$ stabilizer component, $M^{11}$ is selected from Mn, Ti, Ru, Zr, and any combination thereof. For the $Li_\theta Ni_\delta M^{12}_\epsilon M^{13}_\zeta O_2$ active component, $M^{12}$ is selected from Mn, Ti, Zr, Ge, Sn, Te, and any combination thereof; $M^{13}$ is selected from Mg, Be, Ca, Sr, Ba, Fe, Ni, Cu, Zn, and any combination thereof; $0.9<\theta<1.1$; $0.7<\delta<1$; $0<\varepsilon<0.3$; $0<\zeta<0.3$; and $\delta+\varepsilon+\zeta=1$. In some variations of Formula (VIIIb), $0.05<\varepsilon<0.3$ and $0.05<\zeta<0.3$.

In some variations, this disclosure is directed to a cathode active precursor compound, or particles (e.g., a powder) comprising the cathode active precursor, represented by Formula (IXa):

$$(v)[M^7O_2]\cdot(1-v)[Co_{1-\sigma}M^8{}_\sigma O_2] \tag{IXa}$$

wherein $M^7$ is one or more elements with an average oxidation state of 4+ (i.e., tetravalent); $M^8$ is one or more monovalent, divalent, trivalent, and tetravalent elements; $0.01 \le v \le 1.00$, and $0.5 €$ and $0 \le \sigma \le 0.05$. In some variations, $M^7$ is selected from Mn, Ti, Zr, Ru, and a combination thereof. In some variations, $M^8$ is selected from B, Na, Mg, Ti, Ca, V, Cr, Mn, Fe, Co, Ni, Cu, Zn, Al, Sc, Y, Ga, Zr, Ru, Mo and a combination thereof. In some variations, $M^7$ is Mn. In some variations, $M^8$ is Al.

In some embodiments, $0.01 \le v \le 0.50$. In some embodiments, $0.01 \le v \le 0.50$. In some embodiments, $0.01 \le v \le 0.30$. In some embodiments, $0.01 \le v \le 0.10$. In some embodiments, $0.01 \le v \le 0.05$. In some variations, $0 \le \sigma \le 0.05$. In some variations, $0 < \sigma \le 0.05$. In some variations, $0 < \sigma \le 0.03$. In some variations, $0 < \sigma \le 0.02$. In some variations, $0 < \sigma \le 0.01$. In some variations, $0.01 \le v \le 0.05$ and $0 < \sigma \le 0.05$.

In some variations, Al is at least 500 ppm. In some variations, Al is at least 750 ppm. In some variations, Al is at least 900 ppm. In some variations, Al is less than or equal to 2000 ppm. In some variations, Al is less than or equal to 1500 ppm. In some variations, Al is less than or equal to 1250 ppm. In some variations, Al is less than or equal to 1000 ppm. In some variations, Al is less than or equal to 900 ppm. In some variations, Al is less than or equal to 800 ppm. In some variations, Al is less than or equal to 700 ppm. In some variations, Al is less than or equal to 600 ppm. In some instances, when $M^8$ (e.g., Al) is expressed in ppm, in optional variations, the compound can be represented as $(v)[Li_2M^7O_3]\cdot(1-v)[Li_\alpha Co_w O_2]$ and the amount of $M^8$ can be represented as $M^8$ in at least a quantity in ppm, as otherwise described above. In some embodiments, $0.5 \le w \le 1$. In some embodiments, $0.8 \le w \le 1$. In some embodiments, $0.96 \le w \le 1$. In some embodiments, $0.99 \le w \le 1$. In some embodiments, w is 1.

In some variations, this disclosure is directed to a cathode active compound, or particles (e.g., a powder) comprising the cathode active compound, represented by Formula (IXb):

$$(v)[Li_2M^7O_3]\cdot(1-v)[Li_\alpha Co_{1-\sigma}M^8{}_\sigma O_2] \tag{IXb}$$

wherein $M^7$ is one or more elements with an average oxidation state of 4+ (i.e., tetravalent); $M^8$ is one or more monovalent, divalent, trivalent, and tetravalent elements; $0.95 \le \alpha \le 1.05$; $0.01 \le v < 1.00$, and $0.5 \le w \le 1$, and $0 \le \sigma \le 0.05$. In some variations, $0.95 \le \alpha \le 0.99$. In some variations, $M^7$ is selected from Mn, Ti, Zr, Ru, and a combination thereof. In some variations, $M^7$ is selected from Mn, Ti, Zr, and Ru. In some variations, $M^8$ is selected from La, Ge, B, Na, Mg, Ti, Ca, V, Cr, Mn, Fe, Co, Ni, Cu, Zn, Al, Sc, Y, Ga, Zr, Ru, Mo and a combination thereof. In some variations, $M^8$ is selected from B, Na, Mg, Ti, Ca, V, Cr, Mn, Fe, Co, Ni, Cu, Zn, Al, Sc, Y, Ga, Zr, Ru, Mo and a combination thereof. In some variations, $M^8$ is selected from B, Na, Mg, Ti, Ca, V, Cr, Mn, Fe, Co, Ni, Cu, Zn, Al, Sc, Y, Ga, Zr, Ru, and Mo. In some variations, $M^7$ is Mn. In some variations, $M^8$ is Al.

In some embodiments, $0.01 \le v \le 0.50$. In some embodiments, $0.01 \le v \le 0.50$. In some embodiments, $0.01 \le v \le 0.30$. In some embodiments, $0.01 \le v \le 0.10$. In some embodiments, $0.01 \le v \le 0.05$. In some variations, $0 \le \sigma \le 0.05$. In some variations, $0 < \sigma \le 0.05$. In some variations, $0 < \sigma \le 0.03$. In some variations, $0 < \sigma \le 0.02$. In some variations, $0 < \sigma \le 0.01$. In some variations, $0.95 \le \alpha \le 1.05$, $0.01 \le v < 0.05$, $0.96 \le w < 1$, and $0 < \sigma \le 0.05$. In some variations, $0.95 \le \alpha \le 0.99$.

In some variations, $M^8$ (e.g., Al) is at least 500 ppm. In some variations, $M^8$ (e.g., Al) is at least 750 ppm. In some variations, $M^8$ (e.g., Al) is at least 900 ppm. In some variations, $M^8$ (e.g., Al) is less than or equal to 2000 ppm. In some variations, $M^8$ (e.g., Al) is less than or equal to 1500 ppm. In some variations, $M^8$ (e.g., Al) is less than or equal to 1250 ppm. In some variations, $M^8$ (e.g., Al) is less than or equal to 1000 ppm. In some variations, $M^8$ (e.g., Al) is less than or equal to 900 ppm. In some variations, $M^8$ (e.g., Al) is less than or equal to 800 ppm. In some variations, $M^8$ (e.g., Al) is less than or equal to 700 ppm. In some variations, $M^8$ (e.g., Al) is less than or equal to 600 ppm. In some instances, when $M^8$ (e.g., Al) is expressed in ppm, the compound can be represented as $(v)[Li_2M^7O_3]\cdot(1-v)[Li_\alpha Co_w O_2]$ and the amount of $M^8$ can be represented as $M^8$ in at least a quantity in ppm, as otherwise described above. In some variations, $0.5 \le w \le 1$. In some variations, $0.8 \le w \le 1$. In some variations, $0.96 \le w \le 1$. In some variations, $0.99 \le w \le 1$. In some variations, w is 1.

In some variations, this disclosure is directed to a cathode active compound, or particles (e.g., a powder) comprising the cathode active compound, represented by Formula (X):

$$Li_\alpha Co_{1-x-y}M_y Mn_x O_\delta \tag{X}$$

wherein $0.95 \le \alpha \le 1.05$, $0<x \le 0.30$, $0 \le y \le 0.10$, and $1.98 \le \delta \le 2.04$, and M is at least one element selected from the group consisting of La, Ge, B, Na, Mg, Ti, Ca, V, Cr, Fe, Co, Ni, Cu, Zn, Al, Sc, Y, Ga, Zr, Ru, and Mo. In some variations, $0.95 \le \alpha \le 1.30$. In some variations, M, is selected from Na, Mg, Ti, Ca, V, Cr, Mn, Fe, Co, Ni, Cu, Zn, Al, Sc, Y, Ga, Zr, Ru, Mo and a combination thereof. The compound of Formula (VII) is single phase. The compound can have a trigonal $R\bar{3}m$ crystal structure. In further variations, $0.98 \le \alpha \le 1.16$ and $0<x \le 0.16$. In some variations $0.98 \le \alpha \le 1.16$, $0<x \le 0.16$, $0<y \le 0.05$, $1.98 \le \delta \le 2.04$.

In some variations, this disclosure is directed to a cathode active compound, or particles (e.g., a powder) comprising the cathode active compound, represented by Formula (XI):

$$Li_\alpha Co_{1-x-y}Al_y Mn_x O_\delta \tag{XI}$$

wherein $0.95 \le \alpha \le 1.05$, $0<x \le 0.30$, $0 \le y \le 0.10$, and $1.98 \le \delta \le 2.04$. In some variations, $0.96 \le \alpha \le 1.04$, $0<x \le 0.10$, $0 \le y \le 0.10$, and $1.98 \le \delta \le 2.04$. In some variations, $0.95 \le \alpha \le 1.30$. In some variations, the compounds represented by Formula (XI) have $0.98 \le \alpha \le 1.01$, $0.02 \le x \le 0.04$, $0 \le y \le 0.03$, and $1.98 \le \delta \le 2.04$. The compound of Formula (XI) is a single phase. The compound can have trigonal $R\bar{3}m$ crystal structure.

In other instances, the compounds represented by Formulae (X) and (XI), in any combination of variables described above, have $0.95 \le \alpha$. In some instances, $\alpha \le 1.05$. In some instances, $\alpha \le 1.04$. In some instances, $\alpha \le 1.03$. In some instances, $\alpha \le 1.02$. In some instances, $\alpha \le 1.01$. In some instances, $\alpha \le 1.00$. In some instances, $\alpha \le 0.99$. In some instances, $\alpha \le 0.98$. In some instances, $0.95 \le \alpha \le 0.99$. In some instances, $0.95 \le \alpha \le 1.00$. In some instances, $0.95 \le \alpha \le 1.01$. In some instances, $0.95 \le \alpha \le 1.02$. In some instances, $0.95 \le \alpha \le 1.03$. In some instances, $0.95 \le \alpha \le 1.04$. In some instances, $0.95 \le \alpha \le 1.05$. In some instances, the compounds represented by Formulae (X) and (XI) have $\alpha>1+x$. In some instances, the compounds represented by Formulae (X) and (XI) have α>1+x. In some instances, α<1+x. As such, α in Formulae (X) and (XI) can deviate from α=1+x, which may be associated with a solid-solution between $Li_2MnO_3$ and $(1-x)LiCo_{1-y}M_yO_2$. This solid solution can be represented by $xLi_2MnO_3\cdot(1-x)LiCo_{1-y}O_2$, and $xLi_2MnO_3\cdot(1-x)Li1-yCo_{1-y}O_2$, or in compact notation, $Li_{1+x}Co_{1-x-y+xy}M_{(1-x)^*y}Mn_xO_{2+x}$ or $Li_{1+x-y+xy}Co_{1-x-y+xy}M_{(1-x)^*y}Mn_xO_{2+x}$.

Methods of Making the Cathode Active Material

The disclosure is further directed to methods of making the cathode active material. The coatings of oxide mixtures or complex oxides are prepared by mixing a cathode active compound particles with a solution mixture that contains the precursors of the metals that are found in the coatings. After drying, the mixture is calcined at elevated temperatures to decompose the precursors into oxides or to promote formation of the complex oxides on the cathode active compound material. The coated cathode active material is then tested as cathode in coin cells that use a Li foil anode, a separator, and flooded electrolyte solution.

In certain variations, a wet impregnation method was used to form an oxide (e.g. $Al_2O_3$, LLTO, or LLGO) coating over a base cathode material. A predetermined amount of base powder (e.g. $Li(Co_{0.97}Mn_{0.03})O_2$ or $Li_{1.00}(Co_{0.99}Mn_{0.01})O_2$) was weighed out into a glass beaker.

In some variations, to form an $Al_2O_3$ coating, an amount of aluminum (Al) precursor needed for the desired amount of coating (e.g., 0.5 wt. %) was calculated based on the weighed amount of base powder. The aluminum precursor included various aluminum salts such as aluminum nitrate, aluminum acetate, or other aluminum salts soluble in water or alcohol. The aluminum precursor was dissolved in a small amount of water or alcohol to form a first clear solution. A desired amount of lithium precursor was calculated using a molar ratio of Li to Al between 0.25 and 1.05. The lithium precursor included lithium hydroxide, lithium nitrate, lithium acetate, or other lithium salts, which are soluble in water or alcohol. The desired amount of lithium precursor was dissolved in a small amount of water or alcohol to form a second clear solution. The first and second clear solutions were mixed together. This mixed solution was then added drop-wise to the base powder while stirring. The volume of solution added was such that the base powder became incipiently wet but not watery (i.e., exhibited a damp consistency). After drying at an elevated temperature (e.g. 50 to 80° C.), the dried base powder was then heat-treated to an elevated temperature (e.g. 500° C.) for a period of time (e.g. 4 hours) in stagnant air. The pH of the first clear solution (i.e., the aluminum solution) can also be varied to improve coating properties such as coating density and uniformity.

In certain variations, to form a LLTO coating, lithium precursor including lithium salts, and lanthanum precursor including lanthanum salts, and titanium precursor including titanium salts are used to form the solution. These salts are soluble in water or alcohol to form a solution. A desired amount of lithium precursor was calculated using a molar ratio of Li to La between 0.25 and 0.30. A desired amount of lithium precursor was calculated using a molar ratio of Li to Ti between 0.15 and 0.19.

In certain variations, to form the LLGO coating, lithium precursor including lithium salts, and lanthanum precursor including lanthanum salts, and germanium precursor including lanthanum salts are used to form the solution. These salts are soluble in water or alcohol to form a solution. A desired amount of lithium precursor was calculated using a molar ratio of Li to La between 0.25 and 0.30. A desired amount of lithium precursor was calculated using a molar ratio of Li to Ge between 0.15 and 0.19.

Cathode Disk

In some variations, cathode disks can be formed from the coated powder. A ball mill may be used to grind powder into finer powder. The density of the cathode disk may increase by reducing the size of the powder.

The porosity of the cathode may affect the performance of an electrochemical cell. A hydraulic press may be used to compact powder to obtain a cathode disk of desired thickness and density during cold pressing. For example, the coated cathode active material was placed in a die that can be compressed up to 5000 lbs. The press includes two plates that are hydraulically forced together to create a pressure.

In some variations, the coated powder including coated particles may be blended with an electrically conductive powder (e.g. carbon), organic binder, and solvent to form a pourable slurry. This slurry may be disposed on an aluminum foil and dried, forming a disk or laminate. The laminate can be subsequently roll-calendared to compact the particulate layer to a high specific density. During calendaring, the coated particles are packed together. The coated particles are sufficient strong to avoid being crushed. It is important to avoid forming crushed particles, because crushed particles can create new active unprotected surfaces that may interact with the electrolyte during cell operation. The finished laminate is assembled together with a separator and anode layers and saturated with an electrolyte solution to form a lithium-ion cell.

Testing Methods

The cathode disks were assembled into button or coin cell batteries with a Li disk anode, a Celgard 2325 separator (25 μm thick), and the electrolyte consisting of 1.2 M LiPF6 in ethyl carbonate (EC) and ethyl methyl carbonate (EMC) (EC:EMC=3:7 w/w). This ½ cell configuration is used to evaluate the capacity, average voltage, volumetric energy density and energy retention of the cathode material. Galvanostatic charge/discharge cycling was conducted in the 3.0-4.5 V range at 25° C. The test procedure includes three formation cycles at a~C/5 rate with the 1 C capacity assumed to be 185 mAh/g, followed by aging cycles at a C/5 rate with the 1 C capacity calculated based on the third cycle discharge capacity. The batteries are aged for 30 to 50 cycles.

An electrochemical tester (e.g. Macoor 4200) provides a user with a variety of options in testing of batteries. Multiple channels can be plugged into the electrochemical tester to allow for multiple batteries to be tested simultaneously. These tests allow the user to measure parameters of the batteries, such as voltage, current, impedance, and capacity, to fully understand the effectiveness of the electrochemical cell being tested. The tester can be attached to a computer to obtain digital testing values.

EXAMPLES

The following examples are for illustration purposes only. It will be apparent to those skilled in the art that many modifications, both to materials and methods, may be practiced without departing from the scope of the disclosure. Following are examples demonstrating the use of LLTO and LLGO coatings on Mn-substituted $LiCoO_2$ electrode materials.

Example 1

A 3 mol % manganese substituted $LiCoO_2$ cathode powder, having the composition represented by $Li_{1.00}(Co_{0.97}Mn_{0.03})O_2$, was synthesized using a co-precipitation process to produce a hydroxide precursor, followed by calcination with lithium carbonate ($Li_2CO_3$). The powder material was then coated with 500 ppm by weight (0.05 wt %) LLTO using the following process. In the coating process, lithium precursor included lithium salt such as lithium nitrate, lanthanum precursor including lanthanum salt such as lanthanum nitrate, and titanium precursor including titanium salt such as titanium tetra-isopropoxide, were mixed together in isopropanol and ultra-sonicated for 10 minutes to form a solution. The solution was mixed with the $Li_{1.00}(Co_{0.97}Mn_{0.03})O_2$ cathode powder in a wet-impregnation process. The powder includes particles. The liquid was enough to wet and coat the particles of the powder, while keeping a powder consistency. The mixture was then dried overnight at an elevated temperature (e.g. 95° C.) and calcined at an elevated temperature (e.g. 400° C.) for a period of time (e.g. 4 hours) in air. A LLTO coated $Li_{1.00}(Co_{0.97}Mn_{0.03})O_2$ powder including coated particles was then formed. The LLTO coating may be a Perovskite $La_{2/3-x}Li_{3x}TiO_3$, where $0 \leq x \leq 2/3$.

A cathode laminate was made from the coated powder as outlined above and used in the assembly of a coin cell with a Li-chip as an anode. The coin cell was cycled between voltages of 3.0 V and 4.5 V at a rate of C/5 (where C/5 (/h) is the discharge (or charge) rate at which a fully charged (or discharged) battery will be completely discharged (or charged) in 5 h.) The electrochemical performance of the cathode formed of the LLTO coated cathode active material is illustrated as a series of voltage-capacity curves after various charge/discharge cycles in FIG. 3.

A comparative sample was made using the same core powder, but coated with 300 ppm $Al_2O_3$ by a wet-impregnation process. An aluminum nitrate solution was formed. The aluminum nitrate solution was mixed with the core powder to form a mixture. The mixture was then dried overnight at an elevated temperature (e.g. 95° C.) and calcined at an elevated temperature (e.g. 450° C.) for a period of time (e.g. 4 hours) in air. The voltage vs discharge curves for the $Al_2O_3$ coated $Li_{1.00}(Co_{0.97}Mn_{0.03})O_2$ material after various charge/discharge cycles are illustrated in FIG. 4.

Figure 3:
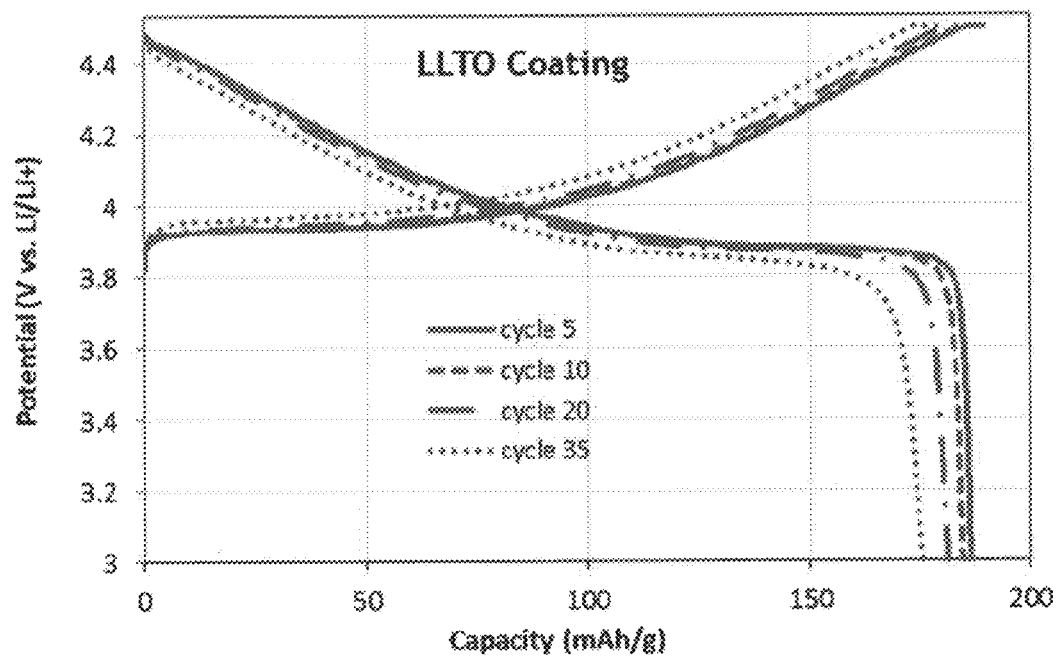
FIG. 3 is a plot of a voltage-capacity profile on the charge/discharge of lithium lanthanum titanium oxide (LLTO) coated $Li_{1.00}(Co_{0.97}Mn_{0.03})O_2$, according to an illustrative embodiment.

FIG. 3 is a plot of a voltage-capacity profile on the charge/discharge of lithium lanthanum titanium oxide (LLTO) coated $Li_{1.00}(Co_{0.97}Mn_{0.03})O_2$, according to an illustrative embodiment. As shown in FIG. 3, when the LLTO coated $Li_{1.00}(Co_{0.97}Mn_{0.03})O_2$ cathode progresses from 5 cycles to 10 cycles, then to 20 cycles, further to 35 cycles, the 'knee' in the discharge curve between discharge capacity of 165 mAh/g and discharge capacity of 185 mAh/g at potential of about 3.8 V stays sharp, with a decrease in the discharge capacity at 3.0 volts of 9.2 mAh/g from cycle 5 to cycle 35. The average voltage after the cycles also remains relatively constant compared to the $Al_2O_3$ coated $Li_{1.00}(Co_{0.97}Mn_{0.03})O_2$ sample. The conducting LLTO coating may help sharpen the knee and improve the energy retention.

As shown in FIG. 3, the LLTO coating also provides an average voltage of 4.03 V, which is higher than an average voltage of 4.00 V for the $Al_2O_3$ coating. Also, the LLTO coating provides a discharge capacity of 185 mAh/g, which is higher than a discharge capacity of 181 mAh/g for the $Al_2O_3$ coating at cycle 5. The result may be due to the electrical conductivity of the LLTO coating. Electrical conductivity of the coating was not measured because of the small amount of coating on the surface and the thin layer. The main evidence from the data is the higher average discharge voltage and the sharp knee at end of the discharge (low voltage) compared to $Al_2O_3$ coating. The bulk material being from the same batch, and the coating process being the same, the difference must come from the coating material.

Figure 4:
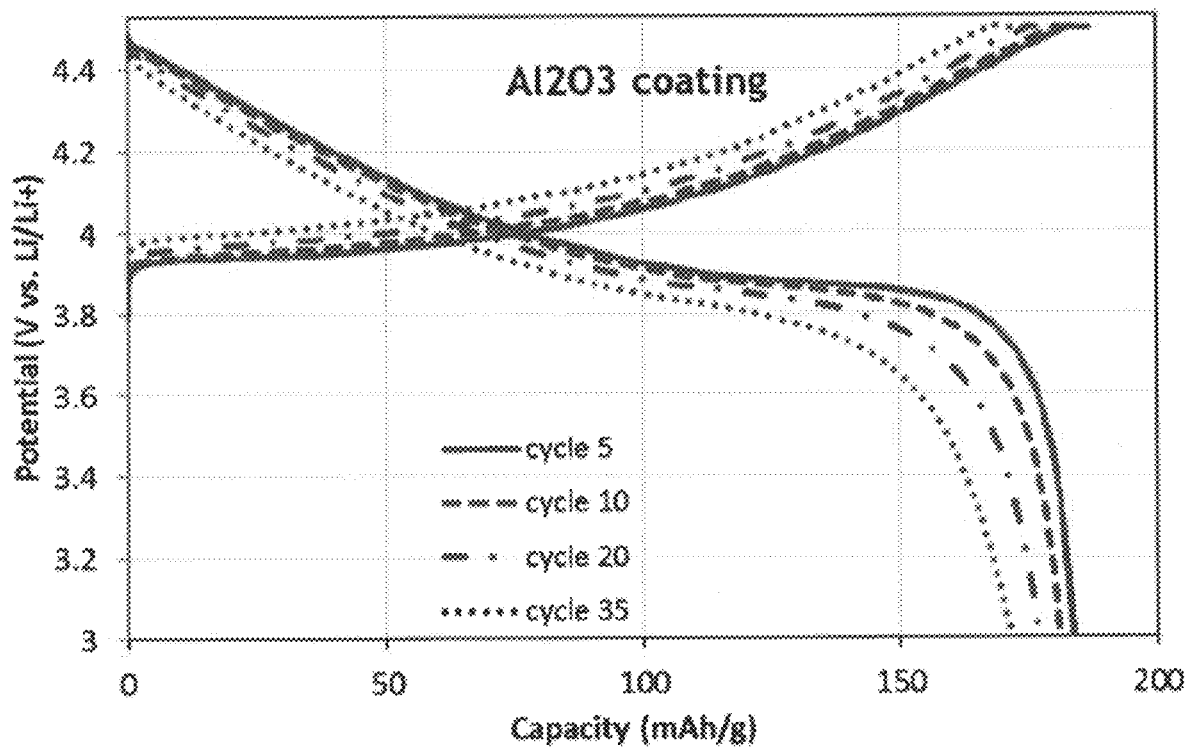
FIG. 4 is a plot of voltage-capacity profile on the charge/discharge of $Al_2O_3$ coated $Li_{1.00}(Co_{0.97}Mn_{0.03})O_2$, according to an illustrative embodiment.

FIG. 4 is a plot of voltage-capacity profile on the charge/discharge of $Al_2O_3$ coated $Li_{1.00}(Co_{0.97}Mn_{0.03})O_2$, according to an illustrative embodiment. As shown in FIG. 4, the average voltage after the cycles is clearly reduced in each cycle from cycle 5 to cycle 35. For example, at a discharge capacity of 150 mAh/g, the average voltage drops from about 3.82 V after 5 cycles to about 3.62 V after 35 cycles. The $Al_2O_3$ coating is non-conductive and thus adds impedance to the cathode base material, which may cause lower average voltage after more cycles and also reduce the energy retention.

When the average voltage increases from 4.0 V to 4.1 V and good retention persists, this average voltage increase of 0.1 V may add 16% to the energy stored in the battery.

Example 2

A 1 mol % manganese substituted $LiCoO_2$ cathode powder, having a composition represented by $Li_{1.00}(Co_{0.99}Mn_{0.01})O_2$, was synthesized using a co-precipitation process to produce a hydroxide precursor, followed by calcination with lithium carbonate ($Li_2CO_3$). The cathode powder $Li_{1.00}(Co_{0.99}Mn_{0.01})O_2$ was then coated with 500 ppm by weight (0.05 wt %) LLTO using the following process. In the coating process, lithium precursor included lithium salt such as lithium nitrate, lanthanum precursor including lanthanum salt such as lanthanum nitrate, and titanium precursor including titanium salt such as titanium tetra-isopropoxide, were mixed together in isopropanol and ultra-sonicated for 10 minutes to form a solution. The solution was then mixed with the cathode powder $Li_{1.00}(Co_{0.99}Mn_{0.01})O_2$ in a wet-impregnation process. The powder includes particles. The liquid was wet enough to coat the particles to form a mixture, but keep a powder consistency. The mixture was then dried at 95° C. for 12 hours and calcined at 450° C. for 4 hours in air. A LLTO coated $Li_{1.00}(Co_{0.99}Mn_{0.01})O_2$ powder including coated particles was then formed. The LLTO coating may be a Perovskite $La_{2/3-x}Li_{3x}TiO_3$, where $0 \leq x \leq 2/3$.

A cathode laminate was made from the coated powder as outlined above and used in the assembly of a coin cell with a Li chip as an anode. The cells were cycled for charge and discharge between voltages of 3.0 V and 4.5 V at a rate of C/5.

Figure 5:
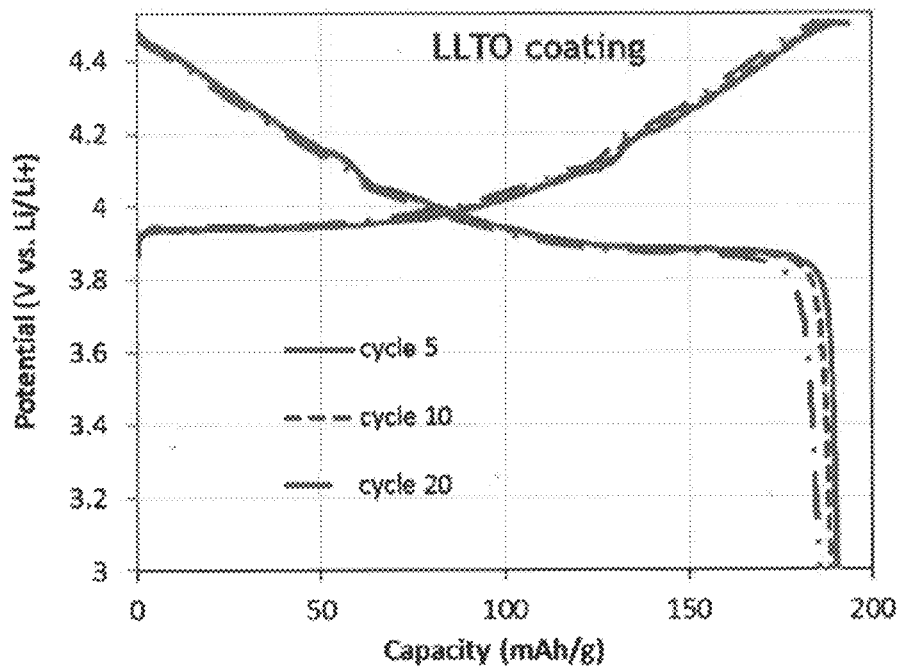
FIG. 5 is a plot of voltage-capacity profile on the charge/discharge of LLTO coated $Li_{1.00}(Co_{0.99}Mn_{0.01})O_2$, according to an illustrative embodiment.

The electrochemical performance of the cathode is illustrated as a series of voltage-capacity curves (also referred to discharge curves) after various charge/discharge cycles in FIG. 5. A comparative sample was made using the same cathode active compound particles, but coated with 300 ppm $Al_2O_3$ by a wet-impregnation process. An aluminum nitrate solution was formed. The aluminum nitrate solution was mixed with the cathode active compound particles to form a mixture. The mixture was then dried overnight at an elevated temperature (e.g. 95° C.) and calcined at an elevated temperature (e.g. 450° C.) for a period of time (e.g. 4 hours) in air. The voltage vs discharge curves for the $Al_2O_3$ coated $Li_{1.00}(Co_{0.99}Mn_{0.01})O_2$ material after various charge/discharge cycles are illustrated in FIG. 6.

FIG. 5 is a plot of voltage-capacity profile on the charge/discharge of LLTO coated $Li_{1.00}(Co_{0.99}Mn_{0.01})O_2$, according to an illustrative embodiment. As the LLTO coated $Li_{1.00}(Co_{0.99}Mn_{0.01})O_2$ cathode is cycled from 5 to 20 cycles, as shown in FIG. 5, the 'knee' in the discharge curve between 176 $Li_{1.00}(Co_{0.97}Mn_{0.03})O_2$ and 183 mAh/g at 3.8V stays sharp, with a decrease in the discharge capacity of 3 mAh/g from cycle 5 to cycle 20 at 3.0 volts. The average voltage after the cycles also remains nearly constant.

Figure 6:
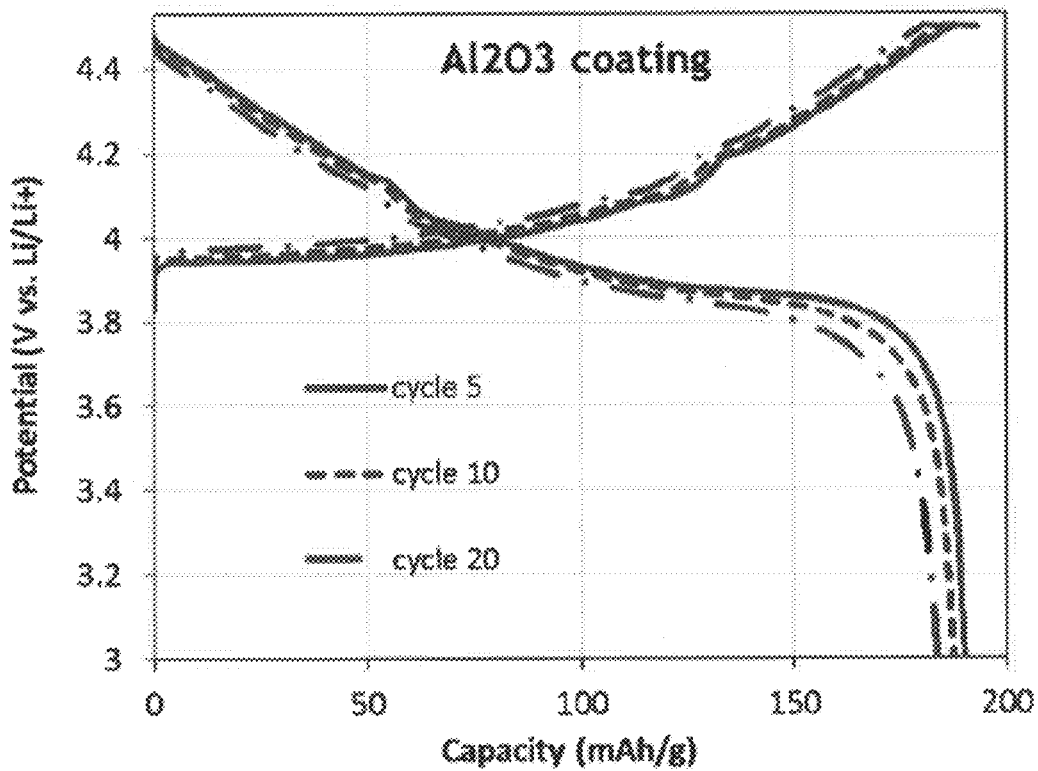
FIG. 6 is a plot of voltage-capacity profile on the charge/discharge of $Al_2O_3$ coated $Li_{1.00}(Co_{0.99}Mn_{0.01})O_2$, according to an illustrative embodiment.

FIG. 6 is a plot of voltage-capacity profile on the charge/discharge of $Al_2O_3$ coated $Li_{1.00}(Co_{0.99}Mn_{0.01})O_2$, according to an illustrative embodiment. When compared to the $Al_2O_3$ coated $Li_{1.00}(Co_{0.99}Mn_{0.01})O_2$ sample, as shown in FIG. 6, the voltage and discharge capacity are clearly reduced each cycle from cycle 5 to cycle 20.

As shown, the cathode formed of the LLTO coated $Li_{1.00}(Co_{0.99}Mn_{0.01})O_2$ material also demonstrates an average voltage of 4.03 V higher than that of 4.01 V for the cathode formed of the $Al_2O_3$ coated $Li_{1.00}(Co_{0.97}Mn_{0.03})O_2$, and a discharge capacity of 188 mAh/g at cycle 5, similar to a discharge capacity of 188 mAh/g for the $Al_2O_3$ coated $Li_{1.00}(Co_{0.99}Mn_{0.01})O_2$ cathode at cycle 5.

In some variations, the conductivity of the base material may also change the rate capability. Compared FIGS. 3-4 with FIGS. 5-6, respectively, the cathode base material $Li_{1.00}(Co_{0.99}Mn_{0.01})O_2$ provides a sharper knee than the cathode base material $Li_{1.00}(Co_{0.97}Mn_{0.03})O_2$ for both the $Al_2O_3$ coating and the LLTO coating. The sharper knee indicates better energy retention or rate capability. As such, the cathode base material $Li_{1.00}(Co_{0.99}Mn_{0.01})O_2$ provides a slightly better performance than the cathode base material $Li_{1.00}(Co_{0.97}Mn_{0.03})O_2$.

Example 3

A 1 mol % manganese substituted $LiCoO_2$ cathode powder, having the composition: $Li_{1.00}(Co_{0.99}Mn_{0.01})O_2$, was synthesized using a co-precipitation process to produce a hydroxide precursor followed by calcination with lithium carbonate ($Li_2CO_3$). The powder was then coated with 500 ppm by weight (0.05 wt %) LLGO using the following process. In the coating process, lithium precursor included lithium salt such as lithium nitrate, lanthanum precursor including lanthanum salt such as lanthanum nitrate, and titanium precursor including germanium salt such as germanium ethoxide, were mixed together in isopropanol and ultra-sonicated for 10 minutes to form a solution. The solution was mixed with the cathode powder in a wet-impregnation process. The powder includes particles. The liquid was wet enough to coat the particles to form a mixture, but keep a powder consistency. The mixture was then dried at 95° C. for 12 hours and calcined at 450° C. for 4 hours in air. A LLGO coated $Li_{1.00}(Co_{0.99}Mn_{0.01})O_2$ powder including coated particles was then formed. The LLGO coating may be a Perovskite $La_{2/3-x}Li_{3x}GeO_3$, like the Perovskite $La_{2/3-x}Li_{3x}TiO_3$, where $0 \leq x \leq 2/3$.

A cathode laminate was made from the coated powder as outlined above and used in the assembly of a coin cell with a Li chip as an anode. The cells were cycled between voltages of 3.0 V and 4.5 V at a rate of C/5.

Figure 7:
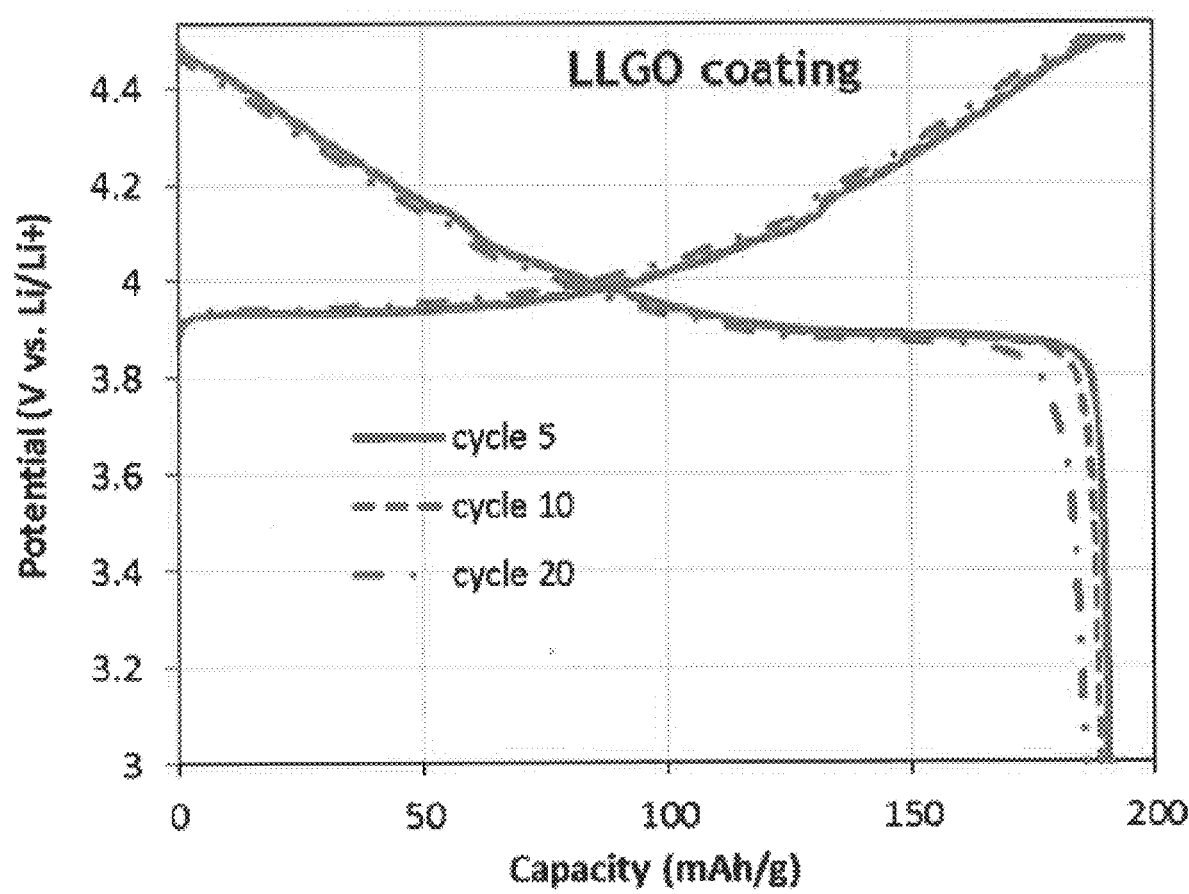
FIG. 7 is a plot of voltage-capacity profile on the charge/discharge of lithium lanthanum germanium oxide (LLGO) coated $Li_{1.00}(Co_{0.99}Mn_{0.01})O_2$, according to an illustrative embodiment.

The electrochemical performance of the cathode is illustrated as a series of voltage vs. discharge capacity after charge/discharge cycles in FIG. 7. A comparative sample was made using the same cathode active compound particles, but coating with 300 ppm by weight (0.03 wt %) $Al_2O_3$ by a wet-impregnation process. An aluminum nitrate solution was formed. The aluminum nitrate solution was mixed with the cathode active compound particles to form a mixture. The mixture was then dried overnight at an elevated temperature (e.g. 95° C.) and calcined at an elevated temperature (e.g. 450° C.) for a period of time (e.g. 4 hours) in air. The voltage-capacity curves after various charge/discharge cycles for the $Al_2O_3$ coated $Li_{1.00}(Co_{0.99}Mn_{0.01})O_2$ material is illustrated in FIG. 6.

FIG. 7 is a plot of voltage-capacity profile on the charge/discharge of lithium lanthanum germanium oxide (LLGO) coated $Li_{1.00}(Co_{0.99}Mn_{0.01})O_2$, according to an illustrative embodiment. As shown in FIG. 7, when the LLGO coated $Li_{1.00}(Co_{0.99}Mn_{0.01})O_2$ cathode progresses from 5 cycles to 10 cycles and further to 20 cycles, the 'knee' in the discharge curve (between 175 mAh/g and 184 mAh/g at about 3.8V) stays sharp, with a decrease in the discharge capacity at 3.0 volts of 3 mAh/g from cycle 5 to cycle 20. The average voltage after the cycles also remains relatively constant compared to the $Al_2O_3$ coated $Li_{1.00}(Co_{0.99}Mn_{0.01})O_2$ sample, as shown in FIG. 6, which is clearly reduced in each cycle from 5 to 20.

The LLGO coated $Li_{1.00}(Co_{0.99}Mn_{0.01})O_2$ cathode also shows an average voltage of 4.04, which is higher than an average voltage of 4.01 V for the $Al_2O_3$ coated $Li_{1.00}(Co_{0.99}Mn_{0.01})O_2$ cathode. The LLGO coated $Li_{1.00}(Co_{0.99}Mn_{0.01})O_2$ cathode also provides a discharge capacity 189 at cycle 5, which is higher than 188 mAh/g for the $Al_2O_3$ coated $Li_{1.00}(Co_{0.99}Mn_{0.01})O_2$ cathode at cycle 5. Other possible oxides can be found in the paper: ACS Appl. Mater. Interfaces 2015, 7, 23685-2369. These are $Li_{1.3}Ti_{1.7}Al_{0.3}(PO_4)_3$ (LATP), $Li_{1.5}Al_{0.5}Ge_{1.5}(PO_4)_3$ (LAGP). The basis for choosing candidate coating materials is based on having a high oxidation potential >3.7 V.

The coatings, powder, and cathode active materials can be used in batteries as described herein. The materials can be used in electronic devices. An electronic device herein can refer to any electronic device known in the art, including a portable electronic device. For example, the electronic device can be a telephone, such as a cell phone, and a land-line phone, or any communication device, such as a smart phone, including, for example an iPhone®, an electronic email sending/receiving device. The electronic device can also be an entertainment device, including a portable DVD player, conventional DVD player, Blue-Ray disk player, video game console, music player, such as a portable music player (e.g., iPod®), etc. The electronic device can be a part of a display, such as a digital display, a TV monitor, an electronic-book reader, a portable web-browser (e.g., iPad®), watch (e.g., AppleWatch), or a computer monitor. The electronic device can also be a part of a device that provides control, such as controlling the streaming of images, videos, sounds (e.g., Apple TV®), or it can be a remote control for an electronic device. Moreover, the electronic device can be a part of a computer or its accessories, such as the hard drive tower housing or casing, laptop housing, laptop keyboard, laptop track pad, desktop keyboard, mouse, and speaker. The battery and battery packs can also be applied to a device such as a watch or a clock. The components powered by a battery or battery pack can include, but are not limited to, microprocessors, computer readable storage media, in-put and/or out-put devices such as a keyboard, track pad, touch-screen, mouse, speaker, and the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

We claim:

1. A cathode active material comprising:
a plurality of cathode active compound particles; and
a coating disposed over each of the plurality of cathode active compound particles, the coating comprising a lithium (Li) ion conducting oxide containing lithium (Li), lanthanum (La) and Germanium (Ge), wherein the conductivity of the conducting oxide is controlled by the ratio of La to Li.

2. The cathode active material of claim 1, wherein each of the plurality of cathode active compound particles comprises the coating of less than 1% by weight.

3. The cathode active material of claim 1, wherein the coating comprises a mixture of the lithium-ion conducting oxide containing La and Ge having a molar ratio of Li to Ge from 0.03 to 0.5 and a molar ratio of Li to La from 0.05 to 1.0 and an electrically conductive material.

4. The cathode active material of claim 1, wherein the plurality of cathode active compound particles comprises lithium cobalt oxides or lithium transition-metal oxides.

5. The cathode active material of claim 1, wherein the cathode active compound particles comprise a compound of Formula (IXb):

$$(v)[Li_2M^7O_3] \cdot (1-v)[Li_\alpha Co_{1-\sigma}M^8{}_\sigma O_2] \tag{IXb}.$$

6. The cathode active material of claim 5, wherein $0.95 \leq \alpha < 0.99$.

7. The cathode active material of claim 5, wherein $M^8$ is selected from Na, Mg, Ti, Ca, V, Cr, Mn, Fe, Co, Ni, Cu, Zn, Al, Sc, Y, Ga, Zr, Ru, and Mo.

8. The cathode active material of claim 1, wherein the cathode active compound particles comprise a compound of Formula (X):

$$Li_\alpha Co_{1-x-y}M_y Mn_x O_\delta \tag{X}$$

wherein
M is selected from La, Ge, B, Na, Mg, Ti, Ca, V, Cr, Fe, Co, Ni, Cu, Zn, Al, Sc, Y, Ga, Zr, Ru, and Mo;
$0.95 \leq \alpha \leq 1.05$;
$0 < x \leq 0.30$;
$0 \leq y \leq 0.10$; and
$1.98 \leq \delta \leq 2.04$.

9. The cathode active material of claim 8, wherein $0.95 \leq \alpha < 0.99$.

10. The cathode active material of claim 8, wherein M is selected from Na, Mg, Ti, Ca, V, Cr, Mn, Fe, Co, Ni, Cu, Zn, Al, Sc, Y, Ga, Zr, Ru, and Mo.

11. A battery cell, comprising:
an anode comprising an anode current collector,
a cathode comprising the cathode active material according to claim 1; and a separator disposed between the anode and the cathode.

12. The battery cell of claim 11, wherein the battery cell has an average voltage of at least 4.0 V after 5 cycles of charge and discharge.

* * * * *